United States Patent
Uemura

(10) Patent No.: US 12,120,503 B2
(45) Date of Patent: Oct. 15, 2024

(54) TERMINAL, BASE STATION, AND RADIO COMMUNICATION METHOD FOR PREDETERMINED PROCESSING CORRESPONDING TO CONDITIONAL CONFIGURATION

(71) Applicant: SOFTBANK CORP., Tokyo (JP)

(72) Inventor: Katsunari Uemura, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 266 days.

(21) Appl. No.: 17/631,430

(22) PCT Filed: Jul. 30, 2019

(86) PCT No.: PCT/JP2019/029806
§ 371 (c)(1),
(2) Date: Jan. 28, 2022

(87) PCT Pub. No.: WO2021/019680
PCT Pub. Date: Feb. 4, 2021

(65) Prior Publication Data
US 2022/0272590 A1    Aug. 25, 2022

(51) Int. Cl.
*H04W 36/00*    (2009.01)
*H04W 36/30*    (2009.01)
*H04W 36/36*    (2009.01)

(52) U.S. Cl.
CPC . *H04W 36/00837* (2018.08); *H04W 36/0058* (2018.08); *H04W 36/302* (2023.05); *H04W 36/362* (2023.05)

(58) Field of Classification Search
CPC ....... H04W 36/00837; H04W 36/0058; H04W 36/30; H04W 24/10; H04W 36/36; H04W 72/04
See application file for complete search history.

(56) References Cited

U.S. PATENT DOCUMENTS 10,805,822 B2 *  10/2020  Kim ............... H04W 24/10
11,039,357 B2 *   6/2021  Park .............. H04W 74/0833
(Continued)

FOREIGN PATENT DOCUMENTS

| | | |
|---|---|---|
| JP | 2016-39582 A | 3/2016 |
| JP | 2016-152600 A | 8/2016 |
| WO | 2019/108114 A1 | 6/2019 |

OTHER PUBLICATIONS

ZTE Corporation, Sanechips, Discussion on single connected handover, GPP TSG-RAN WG2 Meeting #101 R2-1802021 Athens, Greece, Feb. 26-Mar. 2, 2018, 5 Pages (Year: 2018).*
(Continued)

*Primary Examiner* — Mounir Moutaouakil

(57) ABSTRACT

There is provided a terminal including: a reception unit that receives, from a base station, a measurement configuration which associates information indicating an object cell on which given processing is to be performed, with a conditional configuration indicating a condition to initiate the given processing; a measurement unit that measures reception quality of a cell; and a control unit that initiates the given processing corresponding to the conditional configuration when the measured cell is included in the object cell and the reception quality of the measured cell fulfills the condition to initiate the given processing.

8 Claims, 21 Drawing Sheets

| eventID | Event condition |
|---|---|
| Event A1 | Serving becomes better thant hreshold |
| Event A2 | Serving becomes worse than threshold |
| Event A3 | Neighbour becomes offset better than SpCell |
| Event A4 | Neighbour becomes better than threshold |
| Event A5 | SpCell becomes worse than threshold 1 and neighbour becomes better than threshold 2 |
| Event A6 | Neighbour becomes offset better than SCell |
| Event B1 | Inter RAT neighbour becomes better than threshold |
| Event B2 | PCell becomes worse than threshold 1 and inter RAT neighbour becomes better than threshold 2 |

(56) References Cited

U.S. PATENT DOCUMENTS

| | | | |
|---|---|---|---|
| 11,363,492 B2* | 6/2022 | Lu | H04W 36/0069 |
| 2009/0257399 A1* | 10/2009 | Kuo | H04L 63/20 |
| | | | 370/331 |
| 2014/0126545 A1* | 5/2014 | Tamura | H04W 36/0069 |
| | | | 370/332 |
| 2018/0083688 A1* | 3/2018 | Agiwal | H04M 3/537 |
| 2018/0227805 A1* | 8/2018 | Jang | H04W 36/0055 |

OTHER PUBLICATIONS

Japan Patent Office, Office Action for Japanese Patent Application No. 2021-536512, Jun. 2, 2019.

NEC, Reuse of conditional handover for SCG change in NR-DC, 3GPP TSG-RAN WG2#106, R2-1906754, <URL: https://www.3gpp.org/ftp/TSG_RAN/WG2_RL2/TSGR2_106/Docs/R2-1906754.zip >, May 3, 2019, Reno USA (Cited in Japanese Office Action for Japanese Patent Application No. 2021-536512.

WIPO, International Search Report for International Application No. PCT/JP2019/029806, Oct. 21, 2019.

WIPO, Written Opinion for International Application No. PCT/JP2019/029806, Oct. 21, 2019.

Ericsson, RRM for NTN (online, 3GPP TSG RAN WG2 #105bis R2-1903579, Mar. 28, 2019, [retrieved on Oct. 11, 2019], Internet: <URL:https://www.3gpp.org/ftp/tsg_ran/WG2_RL2/TSGR2_105bis/Docs/R2-1903579.zip>, section 2 (Cited in International Search Report and Written Opinion for International Application No. PCT/JP2019/029806).

3GPP TS38.300 v15.6.0, Internet <URL: https://www.3gpp.org/ftp/Specs/archive/38_series/38.30 (Described in paragraphs [0002]-[0005] of the Original Specification of the present application).

3GPP R2-1700544, Internet <URL: https://www.3gpp.org/ftp/TSG_RAN/WG2_RL2/TSGR2_AHs/2017_01_NR/Docs/R2-1700544.zip> (Described in paragraphs [0002]-[0005] of the Original Specification of the present application).

MediaTek Inc., Conditional PSCell addition, 3GPP TSG-RAN WG2 #105bis R2-1903677, Mar. 29, 2019 upload, internet: <URL: https://www.3gpp.org/ftp/tsg_ran/WG2_RL2/TSGR2_105bis/Docs/R2-190367.zip>, Apr. 12, 2019 (This non-patent literature document was cited on Aug. 22, 2022 in an office action for a corresponding Japanese patent application whose number is Japanese Application No. 2021-536512).

* cited by examiner

FIG. 2

| eventID | Event condition |
|---|---|
| Event A1 | Serving becomes better thant hreshold |
| Event A2 | Serving becomes worse than threshold |
| Event A3 | Neighbour becomes offset better than SpCell |
| Event A4 | Neighbour becomes better than threshold |
| Event A5 | SpCell becomes worse than threshold 1 and neighbour becomes better than threshold 2 |
| Event A6 | Neighbour becomes offset better than SCell |
| Event B1 | Inter RAT neighbour becomes better than threshold |
| Event B2 | PCell becomes worse than threshold 1 and inter RAT neighbour becomes better than threshold 2 |

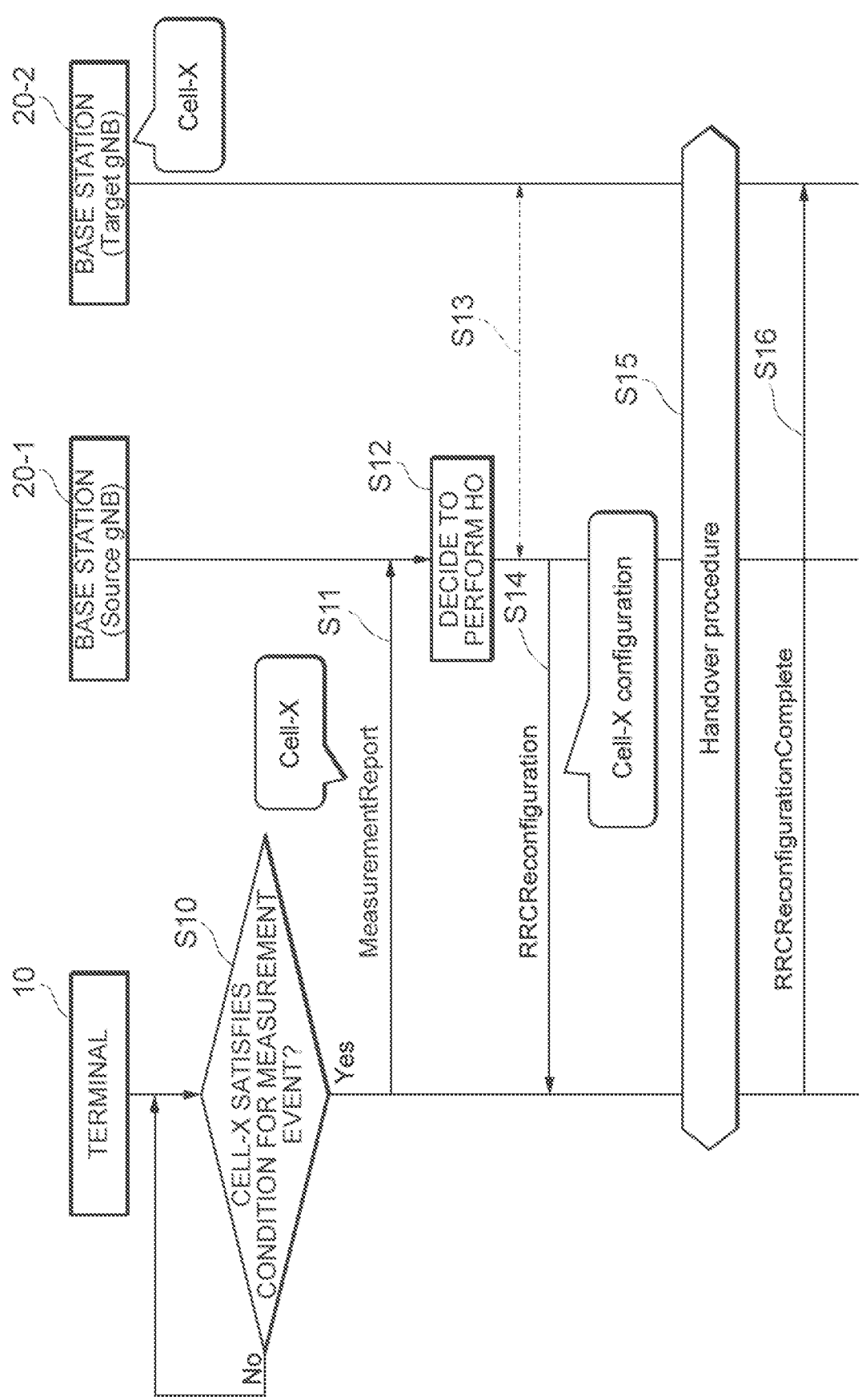

FIG. 20

5.5.4 Measurement report triggering
5.5.4.1 General
<...>
2> if the *reportType* is set to *eventTriggered* and if the entry condition applicable for this event, i.e. the event corresponding with the *eventId* of the corresponding *reportConfig* within *VarMeasConfig*, is fulfilled for one or more applicable cells for all measurements after layer 3 filtering taken during *timeToTrigger* defined for this event within the *VarMeasConfig*, while the *VarMeasReportList* does not include a measurement reporting entry for this *measId* (a first cell triggers the event):

3> if the concerned cell(s) is included in the *CHOcellList* defined within the *VarMeasConfig* for this *measId*:

4> initiate the CHO procedure;

3> else:

4> include a measurement reporting entry within the *VarMeasReportList* for this *measId*;

<...>

4> initiate the measurement reporting procedure, as specified in 5.5.5;

FIG. 21

5.5.4 Measurement report triggering
5.5.4.1 General
<...>
2> if the *reportType* is set to *eventTriggered* and if the entry condition applicable for this event, i.e. the event corresponding with the *eventId* of the corresponding *reportConfig* within *VarMeasConfig*, is fulfilled for one or more applicable cells for all measurements after layer 3 filtering taken during *timeToTrigger* defined for this event within the *VarMeasConfig*, while the *VarMeasReportList* does not include a measurement reporting entry for this *measId* (a first cell triggers the event):

3> if the concerned cell(s) is included in the <u>*CHOcellList* defined within the</u> <u>*VarMeasConfig* for this *measId*:</u>
      <u>4> if the *HOtype* of the corresponding *reportConfig* is set to *CHO*:</u>
         <u>5> initiate the CHO procedure;</u>
      <u>4> else if the *HOtype* of the corresponding *reportConfig* is set to *addSCG*:</u>
         <u>5> initiate the SCG addition procedure;</u>

3> else:
      <u><...></u>

TERMINAL, BASE STATION, AND RADIO COMMUNICATION METHOD FOR PREDETERMINED PROCESSING CORRESPONDING TO CONDITIONAL CONFIGURATION

TECHNICAL FIELD

The present invention relates to a terminal, a base station, and a radio communication method.

BACKGROUND ART

The 3GPP (3rd Generation Partnership Project), which is an international standardizing body, has been examining NR (New Radio), which is a new radio access technology for the $5^{th}$ generation (5G) cellular system. Regarding NR, technology for enabling realization of more various kinds of services than the LTE and LTE-Advanced for the $4^{th}$ generation cellular system is being examined (NPL 1).

For example, the following usage scenarios for different intended uses are defined as implementation requirements for NR: eMBB (enhanced Mobile Broad Band) for realizing high-speed, large-capacity communications; URLLC (Ultra-Reliable and Low Latency Communication) for realizing ultra-reliable and low latency communications; and mMTC (massive Machine Type Communication) for realizing a large number of simultaneous connections by IoT (Internet of Things) devices.

A handover procedure for moving a cell without disconnecting communication is prepared for a radio communication system. Furthermore, a conditional handover procedure for configuring cell information of a handover destination in advance is being examined for the purpose of further enhancement of robustness (safety) of the handover. In the conditional handover procedure which is currently being examined, a terminal decides to initiate the handover, unlike a handover procedure for the LTE (NPL 2).

CITATION LIST

Non-Patent Literature

NPL 1: 3GPP TS38.300 v15.6.0, Internet <URL: https: //www.3gpp.org/ftp/Specs/archive/38_series/ 38.300/38300-f60.zip>
NPL 2: 3GPP R2-1700544, Internet <URL: https: //www.3gpp.org/ftp/TSG_RAN/WG2_RL2/ TSGR2_AHs/2017_01_NR/Docs/R2-17005 44.zip>

SUMMARY OF THE INVENTION

Technical Problem

As the conditional handover procedure is introduced, the effect of enhancing handover success probability can be expected. On the other hand, the conditional handover procedure which is currently being examined has a problem in that limitations occur in mobility procedures other than the handover to a handover candidate cell.

For example, let us assume that when cell A and cell B exist, cell A is indicated as a handover candidate cell and cell B is not indicated as a handover candidate cell. If cell A fulfills a condition to initiate the conditional handover, the terminal performs the handover to cell A. On the other hand, if cell A does not fulfill the condition to initiate the conditional handover and cell B fulfills the condition to initiate the conditional handover, the terminal stops the processing without performing the handover to cell B.

Furthermore, when an actual network form is considered, it can be assumed that it may be sometimes more preferable to add a cell of good quality as a secondary cell group, rather than performing the conditional handover to that cell. However, a method for adding the secondary cell group according to a procedure similar to the conditional handover procedure is not currently being examined.

The present disclosure was made in light of the above-described point and it is an object to provide a flexible mobility procedure.

Solution to Problem

A terminal according to an aspect of the present disclosure includes: a reception unit that receives, from a base station, a measurement configuration which associates information indicating an associated cell on which given processing is to be performed, with a conditional configuration indicating a condition to initiate the given processing; a measurement unit that measures reception quality of a cell; and a control unit that initiates the given processing corresponding to the conditional configuration when the measured cell is included in the associated cell and the reception quality of the measured cell fulfills the condition to initiate the given processing.

A base station according to an aspect of the present disclosure includes: a reception unit that receives a measurement report indicating a reception quality of a cell from a terminal; a generation unit that generates a measurement configuration which associates information indicating an associated cell on which given processing is to be performed, with a conditional configuration indicating a condition to initiate the given processing; and a transmission unit that transmits the generated measurement configuration to the terminal.

Advantageous Effects of the Invention

The flexible mobility procedure can be provided according to the present disclosure.

BRIEF DESCRIPTION OF DRAWINGS

FIG. 2 is a diagram illustrating an example of measurement events;

FIG. 3 is a diagram for explaining a basic procedure for the handover;

FIG. 20 is a diagram illustrating an example of a change to the standard specifications according to this embodiment; and FIG. 21 is a diagram illustrating an example of a change to the standard specifications according to this embodiment.

DESCRIPTION OF EMBODIMENTS

Figure 1:
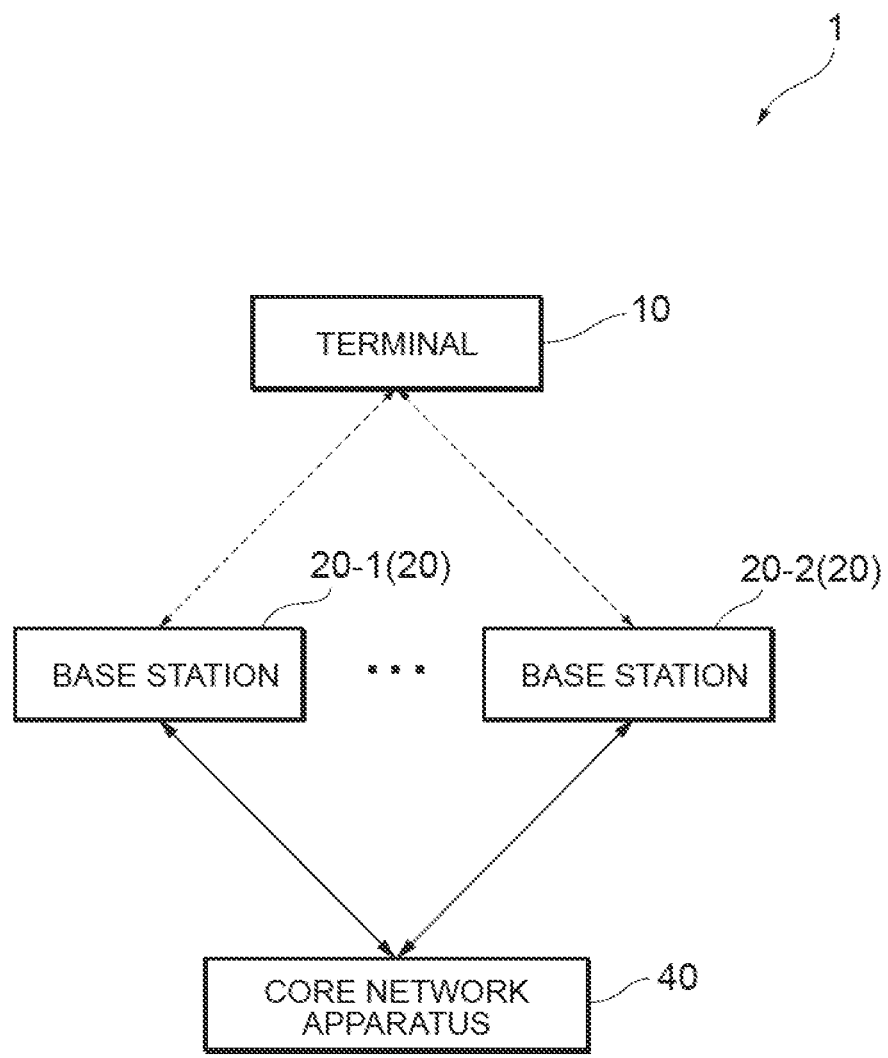
FIG. 1 is a diagram illustrating an example of the configuration of a radio communication system according to this embodiment.

Embodiments of the present invention will be explained with reference to the attached drawings. It should be noted that in each drawing, elements to which the same reference numeral is assigned have the same configuration or similar configurations.

<System Configuration>

An explanation will be provided about a radio communication system according to this embodiment. The radio communication system according to this embodiment is targeted at NR, but it is not limited to this NR. For example, the present invention can be also applied to LTE and LTE-Advanced. Also, it can be applied to a radio communication system which uses NR in part of the radio communication system. More generally, this embodiment can be applied to a radio communication system as long as it is a radio communication system including at least a terminal and a base station; and this embodiment also includes future radio communication systems. Incidentally, in the following explanation, LTE and LTE-Advanced will be hereinafter also referred to as EUTRA, but they mean the same thing.

An area (covered area) formed by the base station is called a cell and each of the EUTRA and the NR is a cellular communication system constructed by a plurality of cells. Either a TDD (Time Division Duplex) method or an FDD (Frequency Division Duplex) method may be applied as the radio communication system according to this embodiment and different methods may be applied for the respective cells.

FIG. 1 is a diagram illustrating an example of the configuration of a radio communication system 1 according to this embodiment. A terminal 10 is wirelessly connected to a base station 20-1 or a base station 20-2, respectively. When the base station 20-1 and the base station 20-2 are not distinguished from each other, they will be hereinafter referred to as the base station 20. Moreover, the terminal 10 can be also wirelessly connected to the base station 20-1 and the base station 20-2 at the same time. The base station 20-1 and the base station 20-2 can use the EUTRA or the NR. For example, the base station 20-1 may use the NR and the base station 20-2 may use the EUTRA, or vice versa. A base station 20 in the EUTRA is called eNB (evolved NodeB); and a base station 20 in the NR is called gNB (g-NodeB). When the term "base station 20" is used hereinafter, it includes the meanings of both eNB and gNB. Also, a terminal 10 in the EUTRA and the NR will be referred to as UE (User Equipment). The base station 20 which is gNB may connect to the terminal 10 by using part of a frequency bandwidth used by the base station gNB (BWP: bandwidth part). When the term "cell" is hereinafter used, it includes BWP.

The terminal 10 is connected to the base station 20 on a cell basis. The terminal 10 may be connected to the base station 20 by using a plurality of cells (carrier aggregation). If the terminal 10 is connected via a plurality of base stations (dual connectivity), a base station which is initially connected is called a master node (MN: Master Node) and a base station which is additionally connected is called a secondary node (SN: Secondary Node). One or more cells provided by a master node, among the plurality of cells to which the terminal 10 connects, is called a master cell group (MSG: Master Cell Group). Furthermore, one or more cells provided by the secondary node, among the plurality of cells to which the terminal 10 connects, is called a secondary cell group (SCG: Secondary Cell Group).

The base stations 20 are connected by a base station interface. Moreover, the base station 20 and a core network apparatus 40 are connected by a core network interface. The base station interface is used for, for example, exchanging a control signal required for handover or cooperative operation between the base stations 20. The core network apparatus 40 controls, for example, the base stations 20 as subordinate, and mainly handles load control between the base stations, mobility control such as calling (paging) and area registration of the terminal 10.

The terminal 10 and the base station 20 transmit/receive, in their radio resource control (RRC: Radio Resource Control) layer, an RRC message. Moreover, the terminal 10 and the base station 20 transmit/receive, in their medium access control (MAC: Medium Access Control) layer, a MAC control element (MAC CE: MAC Control Element). The RRC message is transmitted as an RRC PDU (Protocol Data Unit) and the following logical channels are used for mapping to the RRC PDU: a common control channel (CCCH: Common Control Channel), a dedicated control channel (DCCH: Dedicated Control Channel), a paging control channel (PCCH: Paging Control Channel), a broadcast control channel (BCCH: Broadcast Control Channel), or a multicast control channel (MCCH: Multicast Control Channel). The MAC CE is transmitted as a MAC PDU (or MAC subPDU). The MAC subPDU is equivalent to a service data unit (SDU: Service Data Unit), to which an 8-bit header is added, in a MAC layer; and the MAC PDU includes one or more MAC subPDUs.

Subsequently, an explanation will be provided about physical channels and physical signals according to this embodiment. For the physical channels relating to this embodiment, an explanation will be provided below about a physical broadcast channel (PBCH: Physical Broadcast Channel), a physical random access channel (PRACH: Physical Random Access Channel), a physical downlink control channel (PDCCH: Physical Downlink Control Channel), and a channel state information estimation reference signal (CSI-RS: Channel State Information-Reference Signal). Incidentally, in this system, at least the following other signals and channels exist: synchronization signals (Primary Synchronization Signal; Secondary Synchronization Signal), a physical uplink control channel (PUCCH: Physical Uplink Control Channel), a physical downlink shared channel (PDSCH: Physical Downlink Shared Channel), a physical uplink shared channel (PUSCH: Physical Uplink Shared Channel), a scheduling reference signal (SRS: Scheduling Reference Signal), and a demodulation reference signal (DMRS: Demodulation Reference Signal); however, any detailed explanation about them is omitted.

(Physical Broadcast Channel PBCH)

The physical broadcast channel PBCH is transmitted from the base station 20 to the terminal 10 and is used to inform common parameters (broadcast information, system information) in the cells under the control of the base station 20. The system information is further classified into master information block (MIB) and system information blocks (SIB). Incidentally, the system information blocks are further subdivided into SIB1, SIB2, and so on and are then transmitted. The system information includes information which is required for connection to the cell; and, for example, the MIB includes a system frame number and information indicating whether it can be camped to a cell. Furthermore, SIB1 includes, for example, a parameter for calculating the quality of cells (a cell selection parameter), channel information which is used in common within the cell (random access control information, PUCCH control information, and PUSCH control information), and scheduling information of other system information. Furthermore, the PBCH is periodically transmitted as a synchronization signal block (SSB: Synchronization Signal Block [or SS/PBSH]) which forms a set with a synchronization signal. By receiving the SSB, the terminal 10 can acquire cell identifier (cell ID) information and reception timing and, additionally, measure the signal quality of the relevant cell.

(Physical Random Access Channel PRACH)

The physical random access channel PRACH is used by the terminal 10 to transmit a random access preamble(s) to the base station 20. The PRACH is generally used in a state where uplink synchronization is not established between the terminal 10 and the base station 20; and is used for transmission timing adjustment information (timing advance) and an uplink radio resource request(s). Information indicating radio resources available for the random access preamble(s) transmission is transmitted to the terminal by the broadcast information or the RRC message.

(Physical Downlink Control Channel PDCCH)

The physical downlink control channel PDCCH is transmitted from the base station 20 in order to notify the terminal 10 of downlink control information (DCI: Downlink Control Information). The downlink control information includes uplink radio resource information (uplink grant (UL grant)) or downlink radio resource information (downlink grant (DL grant)) which can be used by the terminal 10. The downlink grant is information indicating scheduling of the physical downlink shared data channel PDSCH. The uplink grant is information indicating scheduling of the physical uplink shared data channel PUSCH. When the PDCCH is transmitted as a response to the PRACH (random access preamble), the PDSCH indicated by the PDCCH is a random access response and includes index information of the random access preamble, transmission timing adjustment information, uplink grant, and so on.

(Channel State Information Estimation Reference Signal CSI-RS)

The channel state information estimation reference signal CSI-RS is transmitted by the base station 20 to estimate the downlink state. The CSI-RS can be configured for a transmission resource indicating a location to be transmitted (CSI-RS resource) to each terminal 10, and further configured for the CSI-RS resource with respect to each antenna port. The terminal 10 utilizes the CSI-RS as a measurement signal for frequency and time tracking, mobility management, or beam management.

Next, a brief explanation will be provided about configurations and procedures regarding the measurement of the cell quality and the mobility such as the handover, which are defined in conventional EUTRA and NR specifications.

(Measurement Configuration)

The base station 20 indicates, to the terminal 10 in a connected mode, a measurement configuration including information to perform the measurement of a neighboring cell(s) (signal(s)) and reporting a measurement result. The terminal is indicated the measurement configuration by using dedicated signaling (an RRC message), for example, an RRC Reconfiguration message.

The base station 20 indicates, to the terminal 10, to measure NR and/or EUTRA frequency by notifying the measurement configuration.

Furthermore, the base station 20 configures the measurement configuration for the terminal 10 in order to report about an SSB identifier, quality of each SSB, and cell quality based on SSB, or a CSI-RS identifier, quality of each CSI-RS resource, and cell quality based on the CSI-RS resource.

The measurement configuration includes at least the following parameters.

(1) Measurement Object(s)

A measurement object(s) includes information about an object(s) to be measured by the terminal 10 and it is possible to configure a plurality of measurement objects in a list. In intra-frequency measurements and inter-frequency measurements, the measurement object(s) indicates frequency and time resource information and subcarrier spacing information of a reference signal which should be measured by the terminal 10. For example, in a case of inter-system EUTRA measurements (inter-RAT [Radio Access Technology] E-UTRA measurements), an EUTRA frequency is configured as the measurement object. Furthermore, the base station 20 is allowed to make the measurement object(s) include a list of cells to which cell-specific offset is to be applied, a black cell list, or a white cell list. The cell-specific offset is an offset value which is added to the measurement result at the time of the measurement; the black cell list is a list of cells which are not relevant for (or excluded from) event evaluation (described later) or the measurement report; and the white cell list is a list of cells which are relevant for (or become targeted for) the event evaluation or the measurement report. In order to manage the measurement object(s), the base station 20 configures a measurement object identifier (measObjectId) for each measurement object.

(2) Reporting Configuration(s)

The reporting configuration includes information about the measurement report and one reporting configuration or a plurality of reporting configurations in a list are configured for each measurement object. In order to manage the reporting configuration(s), the base station 20 configures a reporting configuration identifier (reportConfigId) for each reporting configuration. Each reporting configuration includes at least the following information.

Reporting criterion (measurement criterion): a triggering condition (criterion) for the terminal 10 to transmit the measurement report. Either a single event or a periodic event report is configured.

RS type (reference signal type): an RS used by the terminal 10 as a beam measurement result or a cell measurement result. Either the SSB or the CSI-RS is indicated.

Reporting format: information about a quantity of each cell or each beam to be included in the measurement report (for example, configurations of report content (RSRP/RSRQ/SINR), the maximum number of beam for reporting, and the maximum number of cell for reporting).

(3) Measurement Identity(ies) (Measurement Identifier(s))

A measurement identifier (measID) is used to link (or associate or relate) one measurement object to (or with) one reporting configuration. In other words, the measurement identifier (measID) corresponds to one measurement object identifier (measObjectId) and one reporting configuration identifier (reportConfigId). A plurality of measurement identifiers can be also set in a list form. The measurement identifier may be used to link a plurality of reporting configurations to one measurement object or link a plurality of measurement objects to the same reporting configuration. The measurement identifier is included in the measurement report and transmitted to report an event which fulfills the triggering condition, to the base station 20.

(4) Quantity Configuration(s) (Measured Quantity Configuration(S))

It defines configurations of a (weighted) filter for the measurement results. The measurement results are equalized by indicating a filter coefficient for each measured value. The base station 20 may configure different filter coefficients for the content of different reports of different RS types, respectively.

(5) Measurement Gap(s)

It defines a gap period during which the terminal 10 is allowed to perform measurements (particularly, inter-frequency measurements and inter-system measurements) by interrupting the on-going communication Incidentally, each of the measurement configurations is allowed to include configurations for NR and other configurations for RAT (for example, EUTRA) as (1) the measurement object(s), (2) the reporting configuration(s), and (3) the measurement identity(ies).

Regarding the measurement object(s) corresponding to the NR, the terminal 10 performs measurements and reports with respect to cells by which the terminal is served (which are also called "serving cells"), listed cells, and detected cells. Regarding the measurement object(s) corresponding to EUTRA, the terminal 10 performs measurements and reports with respect to the listed cells and the detected cells. The listed cells are cells included in the list provided by the base station 20. The detected cells indicate other cells detected independently by the terminal 10.

(Measurement Event(s))

A condition indicating a trigger to transmit a measurement report message (measurement type) is either a periodic report or an event trigger report (Event triggered) which is indicated by the base station 20. As the event trigger report for the NR, a plurality of measurement events illustrated in FIG. 2 are defined. A measurement event is indicated in the reporting configuration and is managed by an event identifier (eventId).

(Measurement Object Cell (Applicable Cell))

A measurement object cell (applicable cell), which becomes an evaluation object, for each event is defined for the relevant measurement event. For example, a measurement object cell(s) for Event A1 is a serving cell(s). Furthermore, a measurement object cell for Event A3 is a cell(s) (neighboring cell(s)) which is detected with the frequency of the measurement object linked to a reporting configuration including Event A3. However, if the black cell list has been indicated, cells in that list are excluded. Furthermore, if the white cell list is configured, the measurement object cell(s) is a cell(s) in the white cell list.

(Measurement Report Triggering)

When the measurement type is the event trigger report and the measurement result matches the condition indicated by the measurement event, the terminal 10 initiates a measurement report procedure. In other words, the measurement report procedure is initiated when the measurement result of the measurement object cell fulfills an event condition corresponding to the event identifier indicated in the reporting configuration in the measurement configuration. In this case, the terminal 10 reports the measurement result of a cell corresponding to the measurement identifier which fulfills the condition.

(Handover (HO) Procedure)

Next, a basic procedure for the handover is explained in FIG. 3. The terminal 10 (UE) is in a state in communication (Connected Mode) with the base station 20-1 (Source gNB). A measurement configuration to indicate a condition (triggering condition) for a measurement event is configured for the terminal 10. The terminal 10 evaluates the measurement event for a measurement object cell corresponding to the indicated measurement event, among neighboring cells (for example, Event A3) (S10).

In this situation, if the measurement event is fulfilled for one of measurement object cells (Cell-X) (that is, if the measurement result of the measurement object cell (Cell-X) fulfills the condition for the measurement event indicated in the reporting configuration), the terminal 10 initiates the measurement report procedure and transmits a measurement report message (Measurement Report) to the base station 20-1 (S11). The measurement report message includes at least a measurement identifier (measID) corresponding to the measurement event and information of the measurement object cell related to the measurement event (for example, a cell ID of the cell regarding which the event is fulfilled, and its measurement result).

The base station 20-1 which has received the measurement report message: judges whether the terminal 10 should perform the handover or not, on the basis of the received measurement result; and initiates the handover procedure if necessary (S12). Typically, a handover preparation is requested to a base station 20-2 (Target gNB) to which the cell that fulfills the triggering condition (Cell-X) belongs, and information for enabling the terminal 10 to access the base station 20-2 is exchanged between the base stations 20 (S13). Then, the base station 20-1 transfers, to the terminal 10, an RRC message (RRC Reconfiguration) including information which is required for the handover and is transmitted from the base station 20-2.

The terminal 10 performs the handover based on the received RRC message and attempts to acquire synchronization with, and make a random access to, the base station 20-2. If the random access procedure has been successfully performed with the base station 20-2, the terminal 10 transmits a response message (RRC Reconfiguration Complete) corresponding to the received RRC message to the base station 20-2 and completes the handover procedure.

(Conditional Handover (CHO) Procedure)

Figure 4:
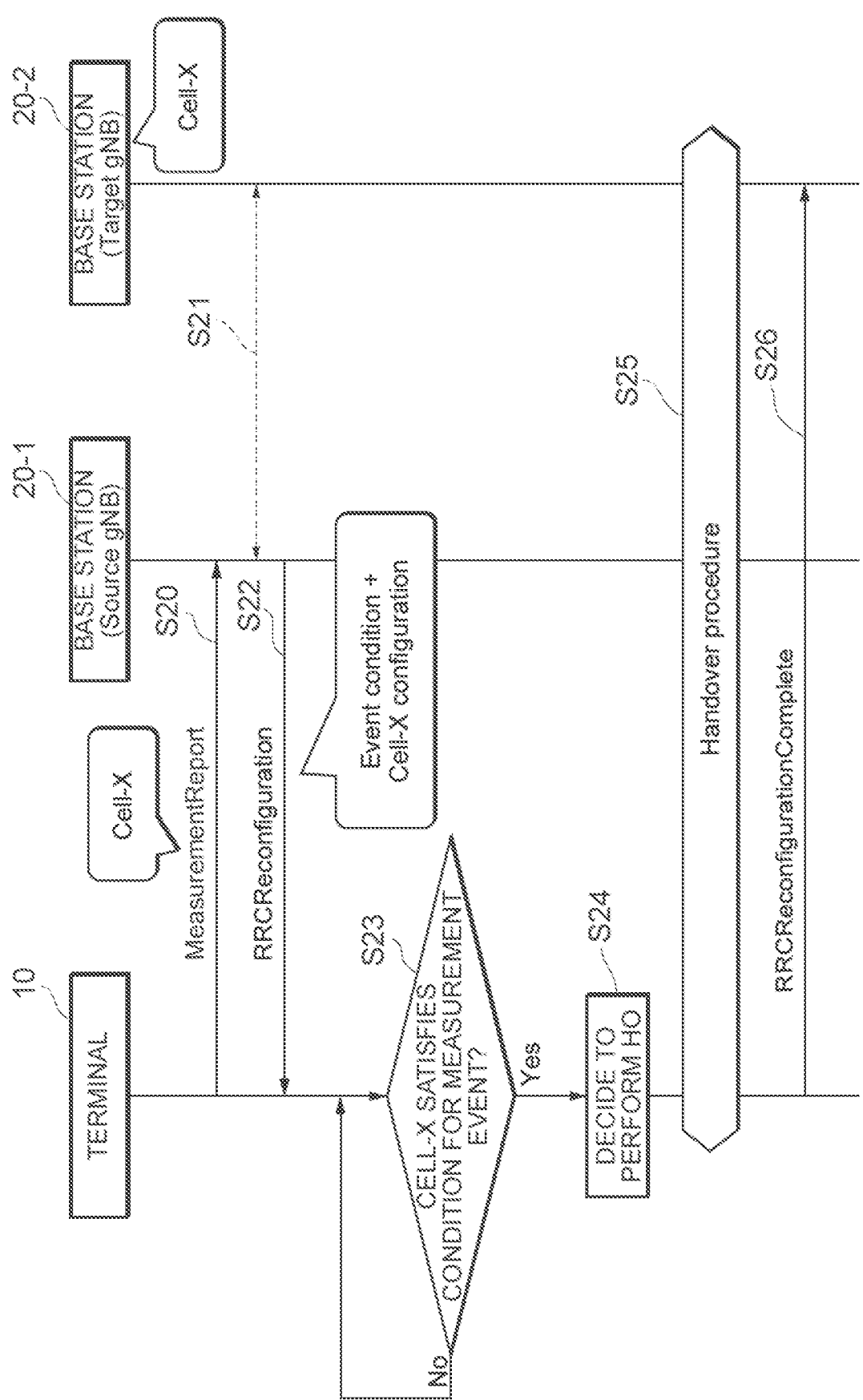
FIG. 4 is a diagram for explaining a basic procedure for the conditional handover.

Next, a basic procedure for the conditional handover is explained in FIG. 4.

A measurement configuration including a measurement event to notify the base station 20 of the initiation of a conditional handover procedure is configured to the terminal 10. The terminal 10 evaluates the measurement event with respect to a measurement object cell corresponding to the indicated measurement event, among neighboring cells.

Under this circumstance, if the measurement event is fulfilled for one of measurement object cells (Cell-X) (that is, if the measurement result of the measurement object cell (Cell-X) fulfills the condition for the measurement event indicated by the reporting configuration), the terminal 10 initiates the measurement report procedure and transmits a measurement report message (Measurement Report) to the base station 20-1 (S20).

The base station 20-1 which has received the measurement report message: judges whether the handover is possible or not, on the basis of the received measurement result; and initiates the conditional handover procedure if necessary. Typically, the handover preparation is requested to the base station 20-2 to which the notified cell (Cell-X) belongs, and information for accessing the base station 20-2 is exchanged between the base stations 20 (S21). Then, the base station 20-1 transfers, to the terminal 10, an RRC message (RRC Reconfiguration) including information which is required for the conditional handover and is transmitted from the base station 20-2 (S22).

The terminal 10 measures a handover candidate cell(s) on the basis of the measurement configuration included in the received RRC message. Specifically, the terminal 10 considers the indicated handover candidate cell(s) as a measurement object cell(s) (applicable cell(s)) and evaluates the measurement event (S23). Then, if the measurement event is fulfilled with respect to the measurement object cell (S23: Yes), the terminal 10 performs the handover based on the indicated configuration information (S24) and attempts to acquire synchronization with, and make a random access to, the base station 20-2 (S25). If the random access procedure has been successfully performed with the base station 20-2, the terminal 10 transmits a response message (RRC Reconfiguration Complete) corresponding to the received RRC message to the base station 20-2 (S26) and completes the conditional handover procedure.

(Secondary Cell Group (SCG) Addition Procedure)

Figure 5:
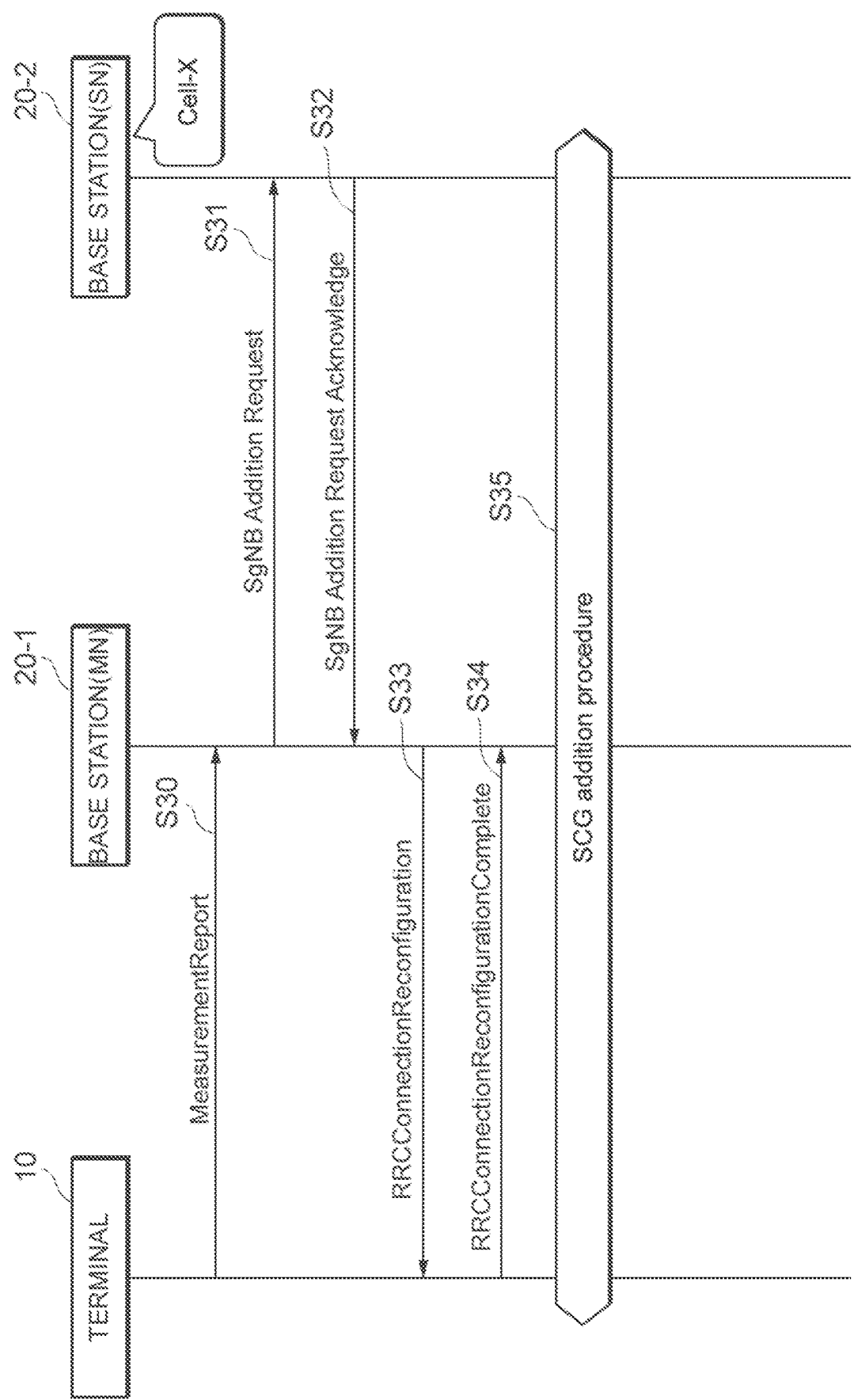
FIG. 5 is a diagram for explaining a basic procedure for adding a secondary cell group.

Next, a basic procedure for adding a secondary cell group is explained in FIG. 5. The terminal 10 (UE) is in a state in communication (Connected Mode) with the base station 20-1 (MN gNB). The terminal 10 evaluates the measurement event with respect to a measurement object cell(s) corresponding to the indicated measurement event, among neighboring cells (for example, Event A4).

Under this circumstance, if the measurement event is fulfilled for one of measurement object cells (Cell-X) (that is, if the measurement result of the measurement object cell (Cell-X) fulfills the condition for the measurement event indicated by the reporting configuration), the terminal 10 initiates the measurement report procedure and transmits a measurement report message (Measurement Report) to the base station 20-1 (S30). The measurement report message includes at least a measurement identifier (measID) corresponding to the measurement event and information of the measurement object cell related to the measurement event (for example, a cell ID of the cell regarding which the event is fulfilled, and its measurement result).

The base station 20-1 which has received the measurement report message: judges whether the terminal 10 should perform the addition of the secondary cell group, on the basis of the received measurement result; and initiates the secondary cell group addition procedure if necessary. Typically, a secondary cell group addition is requested to the base station 20-2 (SN gNB) to which the cell that fulfills the triggering condition (Cell-X) belongs, and information for the terminal 10 to add a cell(s) under control of the base station 20-2 as the secondary cell group is exchanged between the base stations 20 (S31, S32). Then, the base station 20-1 transmits, to the terminal 10, an RRC message (RRC Connection Reconfiguration), including information which is required to add the secondary cell group (S33). Furthermore, the terminal 10 transmits a response message (RRC Connection Reconfiguration Complete) in response to the received RRC message (S34).

The terminal 10 attempts to acquire synchronization with, and make a random access to, the base station 20-2 on the basis of the received RRC message. If the random access procedure has been successfully performed with the base station 20-2, the terminal 10 performs various kinds of processing with the base station 20-2 regarding the addition of the secondary cell group (S35).

Summary of Techniques According to this Embodiment

In this embodiment, for example, as indicated in the processing procedure in step S22 in FIG. 4, when a candidate cell for the conditional handover, other candidate cells besides the above-mentioned candidate cell, and the measurement configuration including the triggering condition regarding the conditional handover procedure are reported from the base station 20 and if the relevant candidate cell does not fulfill the relevant triggering condition (that is, the handover should not be initiated) or if the other candidate cells fulfill the relevant triggering condition, a measurement report message including at least the cell quality of the other candidate cells is transmitted to the base station 20.

Furthermore, it is also assumed that, depending on a movement direction of the terminal 10, it may not always be appropriate to perform the handover, but may be appropriate to add a candidate cell(s) as the secondary cell group in addition to a serving cell(s). So, in this embodiment, as a candidate cell for the secondary cell group and other information are reported from the base station 20 to the terminal 10, it becomes possible for the terminal 10 itself to initiate the procedure to add the candidate cell as the secondary cell group.

<Hardware Configuration>

Figure 6:
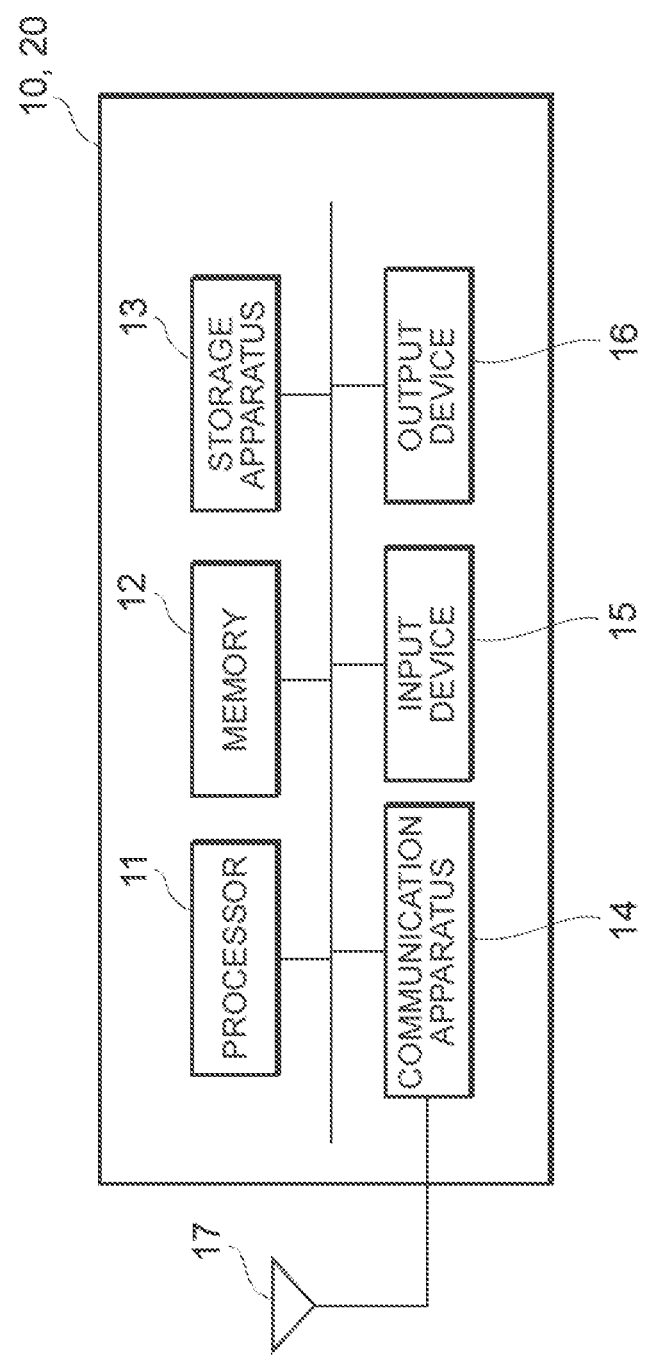
FIG. 6 is a diagram illustrating an example of a hardware configuration of a terminal and a base station.

FIG. 6 is a diagram illustrating an example of a hardware configuration of the terminal 10 and the base station 20. The terminal 10 and the base station 20 include a processor 11, a memory 12, a storage apparatus 13, a communication apparatus 14 which performs wired or radio communication, an input device 15 which accepts input operations, an output device 16 which outputs information, and an antenna 17.

The processor 11 is, for example, a CPU (Central Processing Unit) and controls the terminal 10 and the base station 20.

The memory 12 is configured from, for example, a ROM (Read Only Memory), an EPROM (Erasable Programmable ROM), an EEPROM (Electrically Erasable Programmable ROM), and/or a RAM (Random Access Memory).

The storage apparatus 13 is configured from, for example, a storage unit(s) such as an HDD (Hard Disk Drive), an SSD (Solid State Drive), and/or an eMMC (embedded Multi Media Card).

The communication apparatus 14 is an apparatus which performs communication via a wired and/or radio network, and is, for example, a network card or a communication module. Furthermore, the communication apparatus 14 may include an amplifier, an RF (Radio Frequency) apparatus which performs processing regarding a radio signal, and a BB (Base Band) apparatus which performs a base band signal processing.

The RF apparatus generates a radio signal to be transmitted from the antenna 17 by, for example, performing D/A conversion, modulation, frequency conversion, power amplification, and so on with respect to a digital base band signal received from the BB apparatus. Furthermore, the RF apparatus generates the digital base band signal by performing frequency conversion, demodulation, ND conversion, and so on with respect to the radio signal received from the antenna 17 and transmits the digital base band signal to the BB apparatus. The BB apparatus performs processing for converting the digital base band signal into an IP packet(s) and processing for converting the IP packet(s) into the digital base band signal.

The input device 15 is, for example, a keyboard, a touch panel, a mouse, and/or microphone. The output device 16 is, for example, a display and/or a speaker.

<Functional Block Configuration>
(Terminal)

Figure 7:
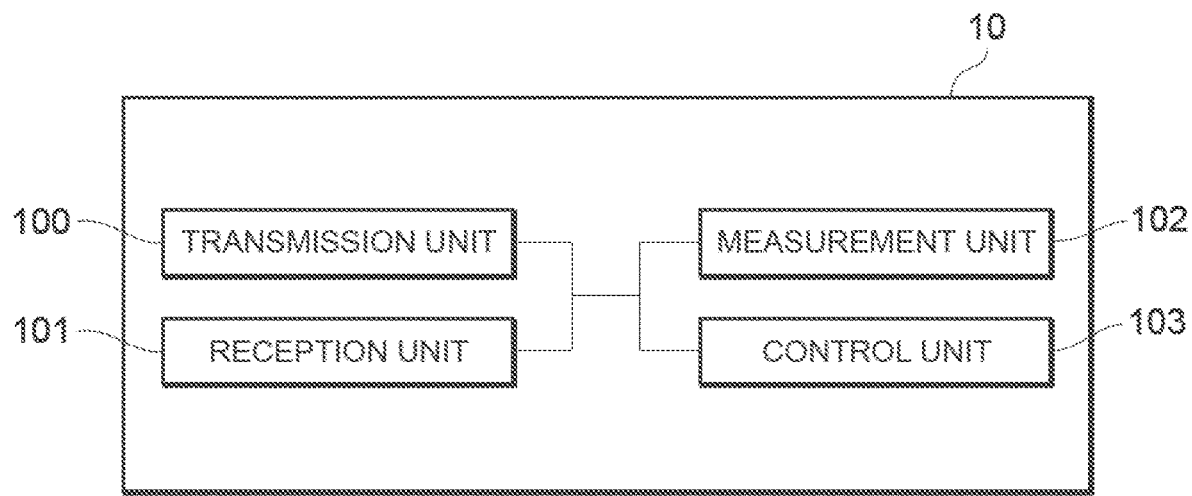
FIG. 7 is a diagram illustrating an example of a functional block configuration of the terminal.

FIG. 7 is a diagram illustrating an example of a functional block configuration of the terminal 10. The terminal 10 includes a transmission unit 100, a reception unit 101, a measurement unit 102, and a control unit 103. Incidentally, FIG. 7 illustrates functional blocks which are required for this embodiment. The transmission unit 100 and the reception unit 101 may be implemented by, for example, the communication apparatus 14 or by the processor 11, in addition to the communication apparatus 14, by executing programs stored in the storage apparatus 13. The measurement unit 102 and the control unit 103 may be implemented by the processor 11 by executing the programs stored in the storage apparatus 13. Furthermore, the programs can be stored in a storage medium. The storage medium which stores the programs may be a non-transitory computer-readable medium. The non-transitory storage medium is not particularly limited, and may be a storage medium such as a USB memory or a CD-ROM.

The transmission unit 100 generates an uplink (Up-Link) signal to be transmitted to the base station 20 and transmits the uplink signal.

The reception unit 101 receives a downlink (Down-Link) signal from the base station 20. Also, the reception unit 101 receives, from the base station 20, measurement configuration information (for example, a measurement configuration) which associates information indicating an object cell on which given processing is performed (for example, a measurement object), with a conditional configuration (for example, a reporting configuration) indicating a condition to initiate the given processing. The given processing includes at least any one of initiating the conditional handover procedure, initiating the secondary cell group addition procedure, and initiating the measurement report procedure. For example, the given processing may include: initiating the conditional handover and initiating the measurement report procedure; adding the secondary cell group and initiating the measurement report procedure; or initiating the conditional handover, adding the secondary cell group, and initiating the measurement report procedure.

The measurement unit 102 measures the reception quality (cell quality) of a cell(s). The reception quality may be, for example, RSRP (Reference Signal Received Power), RSRQ (Reference Signal Received Quality), RSSI (received signal strength indicator), and RS-SINR (Reference Signal-Signal to Interference and Noise Ratio).

The control unit 103 performs various processing regarding, for example, RRC layer. Also, if the cell measured by the measurement unit 102 is included in the object cell for the given processing and if the reception quality of the cell measured by the measurement unit 102 fulfills the conditional configuration indicating the condition to initiate the given processing, the control unit 103 performs given processing corresponding to the relevant conditional configuration. For example, if a condition to transmit a measurement report (for example, Event A1 mentioned earlier) is configured in the reporting configuration, the control unit 103 transmits a measurement report message, including the measurement result of the relevant cell, to the base station 20.

Furthermore, the given processing may include at least initiating the conditional handover procedure and initiating the measurement report procedure; and the information indicating the object cell of the given processing may include information indicating the object cell of the conditional handover and information indicating the object cell of the measurement report (such as a frequency, a black cell list, and a white cell list); and the conditional configuration indicating the condition to initiate the given processing may include the conditional configuration indicating the condition to initiate the conditional handover procedure.

In this case, if the cell measured by the measurement unit 102 is included in the object cell of the conditional handover and the reception quality of the measured cell fulfills the conditional configuration indicating the condition to initiate the conditional handover procedure, the control unit 103 performs the conditional handover procedure.

Furthermore, if the cell measured by the measurement unit 102 is not included in the object cell of the conditional handover, but the measured cell is included in the object cell of the measurement report and the reception quality of the measured cell fulfills the conditional configuration indicating the condition to initiate the conditional handover procedure, the control unit 103 transmits the measurement report message including the reception quality of the measured cell to the base station 20.

Furthermore, the given processing may include at least initiating the addition of the secondary cell group; the information indicating the object cell of the given processing may include the information indicating the object cell of the secondary cell group; and the conditional configuration indicating the condition to initiate the given processing may include the conditional configuration indicating the condition to initiate the secondary cell group addition procedure.

In this case, if the measured cell is included in the object cell of the secondary cell group and the reception quality of the measured cell fulfills the conditional configuration indicating the condition to initiate the secondary cell group addition procedure, the control unit 103 performs the processing for adding the measured cell as the secondary cell group.

Furthermore, the given processing may include initiating the secondary cell group addition procedure and initiating the measurement report procedure; the information indicating the object cell of the given processing may include the information indicating the object cell of the secondary cell group and the information indicating the object cell of the measurement report; and the conditional configuration indicating the condition to initiate the given processing may include the conditional configuration indicating the condition to initiate the secondary cell group addition procedure.

In this case, if the measured cell is not included in the object cell of the secondary cell group, but the measured cell is included in the object cell of the measurement report and the reception quality of the measured cell fulfills the conditional configuration indicating the condition to initiate the secondary cell group addition procedure, the control unit 103 transmits the measurement report message including the reception quality of the measured cell to the base station 20.
(Base Station)

Figure 8:
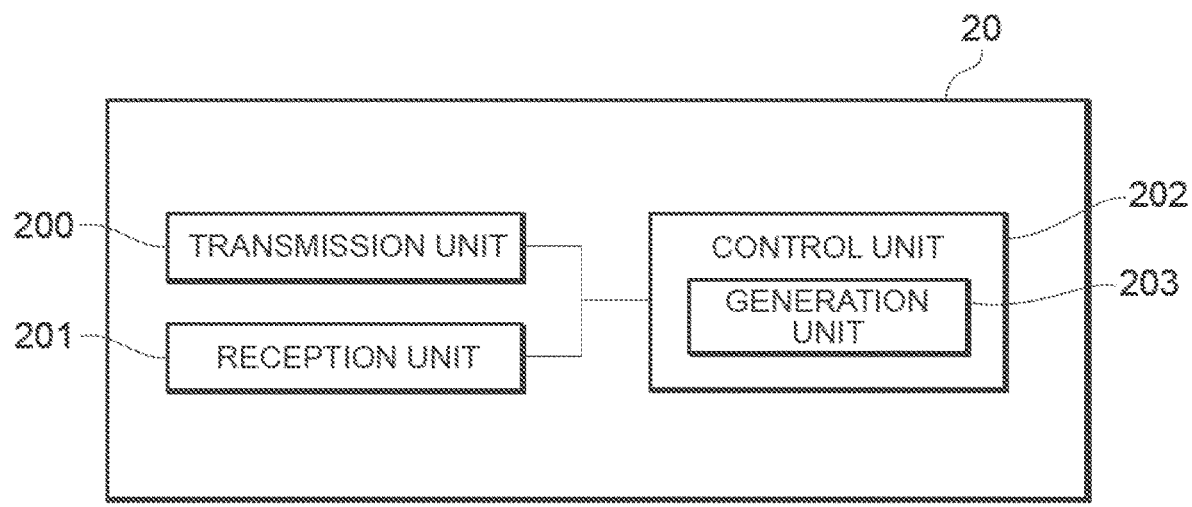
FIG. 8 is a diagram illustrating an example of a functional block configuration of the base station.

FIG. 8 is a diagram illustrating an example of a functional block configuration of the base station 20. The base station 20 includes a transmission unit 200, a reception unit 201, and a control unit 202. Incidentally, FIG. 8 illustrates functional blocks which are required for this embodiment. The transmission unit 200 and the reception unit 201 may be implemented by, for example, the communication apparatus 14 or by the processor 11, in addition to the communication apparatus 14, by executing programs stored in the storage apparatus 13. The control unit 202 may be implemented by the processor 11 by executing the programs stored in the storage apparatus 13. Furthermore, the programs can be stored in a storage medium. The storage medium which stores the programs may be a non-transitory computer-readable medium. The non-transitory storage medium is not particularly limited, and may be a storage medium such as a USB memory or a CD-ROM.

The transmission unit 200 generates a downlink signal to be transmitted to the terminal 10 and transmits the downlink signal.

The reception unit 201 receives the uplink signal from the terminal 10. For example, the reception unit 201 receives the measurement report message indicating the reception quality of the cell from the terminal 10.

The control unit 202 performs various processing regarding, for example, RRC layer. Furthermore, the control unit 202 includes a generation unit 203 that generates an RRC message.

The generation unit 203 generates measurement configuration information (for example, the measurement configuration) including the information indicating the object cell on which the given processing is to be performed (for example, the measurement object) and the conditional configuration indicating the condition to initiate the given processing (for example, the reporting configuration), on the basis of the measurement report received by the reception unit 201. The measurement configuration information generated by the generation unit 203 is transmitted from the transmission unit 200 to the terminal 10.

<Processing Procedure>

Next, the processing procedures performed by the radio communication system 1 according to this embodiment is specifically explained.

(Conditional Handover Procedure)

Figure 9:
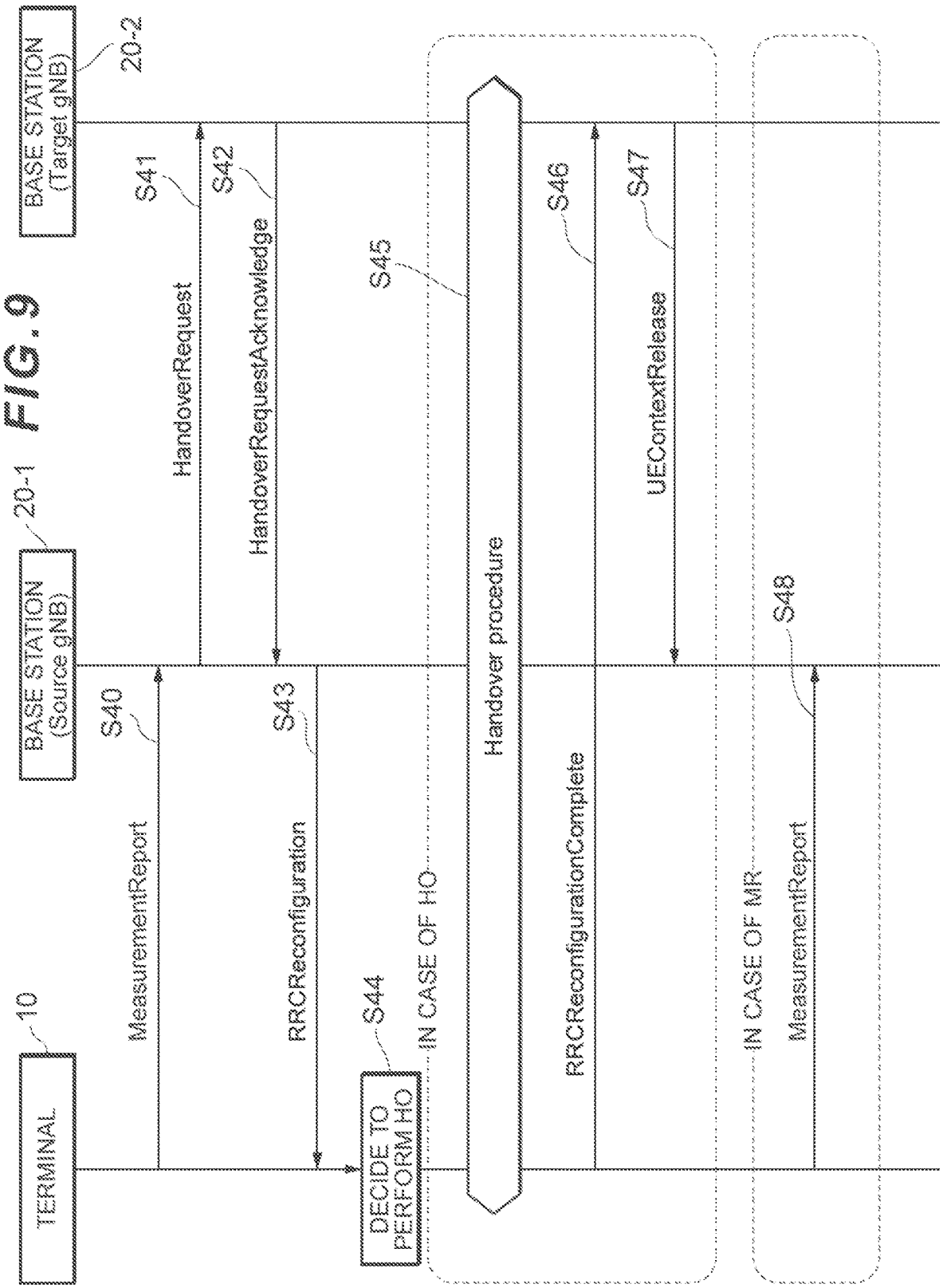
FIG. 9 is a diagram illustrating an example of a conditional handover procedure according to this embodiment.

FIG. 9 is a diagram illustrating an example of the conditional handover procedure according to this embodiment. Firstly, a measurement configuration including a measurement event which triggers the transmission of a measurement report message (Event X1 in this example) is configured for the terminal 10. The terminal 10 evaluates the measurement event with respect to a cell corresponding to the indicated measurement event (Event X1) among neighboring cells.

In this situation, if a measurement event is fulfilled for one of measurement object cells (Cell-X1) (that is, if the measurement result of the measurement object cell (Cell-X) fulfills the condition for Event X1), the terminal 10 transmits a measurement report message to the base station 20-1 (S40).

The base station 20-1 which has received the measurement report message: determines that the terminal 10 has detected Cell-X1 which fulfills the condition for Event X1; and transmits a message indicating the initiation of the conditional handover preparation (for example, a handover request message) to the base station 20-2 which provides Cell-X1 (S41). The base station 20-2 generates an RRC message, including necessary information for the terminal 10 to perform conditional handover processing, and transmits a handover response including the generated RRC message (for example, Handover Request Acknowledge) to the base station 20-1 (S42). Incidentally, the RRC message includes measurement configuration that includes: a measurement object including information explicitly indicating the object cell of the conditional handover (Cell-X1 in this example); and a reporting configuration including a triggering condition regarding the conditional handover procedure (Event Y1 in this example). In this situation, the terminal 10 considers measurement object cells other than the object cell of the conditional handover (Cell-X1), among the measurement object cells based on the measurement object and the reporting configuration, as object cells of the measurement report (Cell-Y1 and Cell-Z1 are assumed in this example).

The base station 20-1 which has received the handover response message from the base station 20-2 transmits an RRC message (RRC Reconfiguration), including the measurement configuration included in the received handover response message, to the terminal 10 (S43).

The terminal 10 decides whether or not to initiate the conditional handover procedure by measuring (judging) whether Cell-X1 fulfills Event Y1 or not, on the basis of the measurement configuration included in the received RRC message (S44). If Cell-X1 fulfills Event Y1, the terminal 10 acquires synchronization with Cell-X1 and attempts to make a random access to the base station 20-2 (S45). If the random access procedure with the base station 20-2 has been successfully performed, the terminal 10 transmits a response message (for example, RRC Reconfiguration Complete) corresponding to the RRC message received in the processing procedure in step S43 to the base station 20-2 (S46). Then, the base station 20-2 transmits a message (UE Context Release) indicating the base station 20-1 to delete UE context (terminal-related information regarding the connection) of the terminal 10 (S47).

In the processing procedure of step S44, let us assume that Cell-X1 does not fulfill Event Y1, but the terminal 10 determines that Cell-Y1 fulfills Event Y1. In this case, the terminal 10 transmits a measurement report message (Measurement Report) indicating that Cell-Y1 fulfills Event Y1, to the base station 20-1. Then, the base station 20-1 may perform, for example, a processing procedure similar to the processing procedure in step S41 to step S43 between the base station 20, which provides Cell-Y1, and the terminal 10. The terminal 10 can perform the handover to Cell-Y1 by performing the conditional handover procedure.

Incidentally, it is desirable that Event X1 should be different from a conventional measurement event corresponding to the condition to initiate the handover procedure. For example, if a conventional measurement event A3 is a condition defining that "the quality of a neighboring cell exceeds the quality of a serving cell, by 3 dB for 3 seconds," it is desirable that Event X1 could be a measurement event which defines that: (a) the quality of the neighboring cell exceeds the quality of the serving cell by 3 dB for one second; or (b) the quality of the neighboring cell exceeds the quality of the serving cell by 2 dB for 3 seconds. What is described above are just examples and conditions other than those may be used; however, it is desirable that the measurement event, used by the base station 20 to judge whether to initiate the conditional handover, could be less restrictive than the conventional measurement event (such as Event A3) used to initiate the handover procedure.

This is because the measurement report message in the conditional handover procedure is used for the purpose of notifying the base station 20 of "a cell which may highly possibly be a handover destination," while the measurement report message in the conventional handover procedure is used for the purpose of notifying the base station 20 of "a cell which fulfills the triggering condition regarding the handover."

Figure 10:
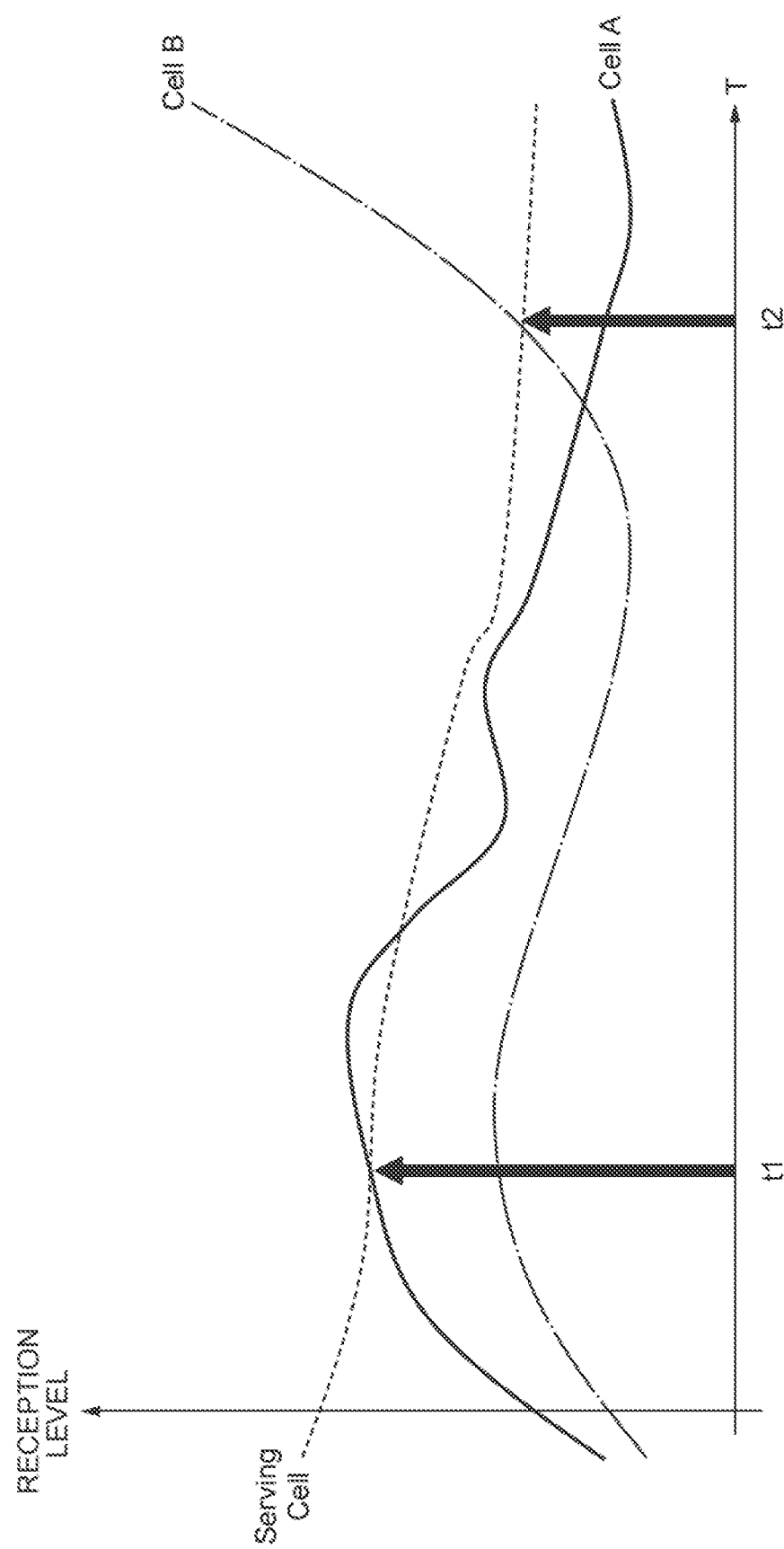
FIG. 10 is a diagram illustrating an example of fluctuations of cell quality according to this embodiment.

FIG. 10 is a diagram illustrating an example of fluctuations of the cell quality according to this embodiment. The terminal 10 performs the measurement by considering neighboring cells (Cell A and Cell B) as measurement object cells at a start point in FIG. 10. Let us assume that at a time t1, the cell quality of Cell A fulfills a measurement event (Event X1) for the base station 20 to judge whether to initiate the initiation of the conditional handover. In this case, the terminal 10 notifies the base station 20 of a measurement report message indicating that Cell A fulfills the measurement event. Let us assume that between times t1 and t2, the terminal 10 receives an RRC message, including a conditional handover object cell (Cell A) and a condition to initiate the activation of the conditional handover procedure (Event Y1), from the base station 20. In this case, the terminal 10 considers Cell A as an object cell of Event Y1 (that is, the conditional handover) and considers Cell B as a measurement object cell of the measurement report. In this situation, if the terminal 10 moves in a direction away from Cell A and the cell quality of Cell A does not fulfill Event Y1 even at the time t2 (if the cell quality of Cell A does not exceed the cell quality of the serving cell by a certain amount or more), the terminal 10 does not perform the handover to Cell A (does not initiate the conditional handover procedure). On the other hand, if the cell quality of Cell B fulfills Event Y1 at or after the time t2 (if the cell quality of Cell B exceeds the cell quality of the serving cell by a certain amount or more), the terminal 10 notifies the base station 20 of a measurement report message indicating that the cell quality of Cell B fulfills Event Y1. After that, the base station 20 may transmit an RRC message, including the conditional handover object cell (Cell B) and the condition to initiate the initiation of the conditional handover procedure (Event Y1), to the terminal 10. Alternatively, the base station 20 may transmit an RRC message indicating the conventional handover procedure to Cell B, to the terminal 10. Consequently, the terminal 10 is allowed to perform the conditional handover (or the handover) to Cell B.

(Secondary Cell Group Addition Procedure)

Figure 11:
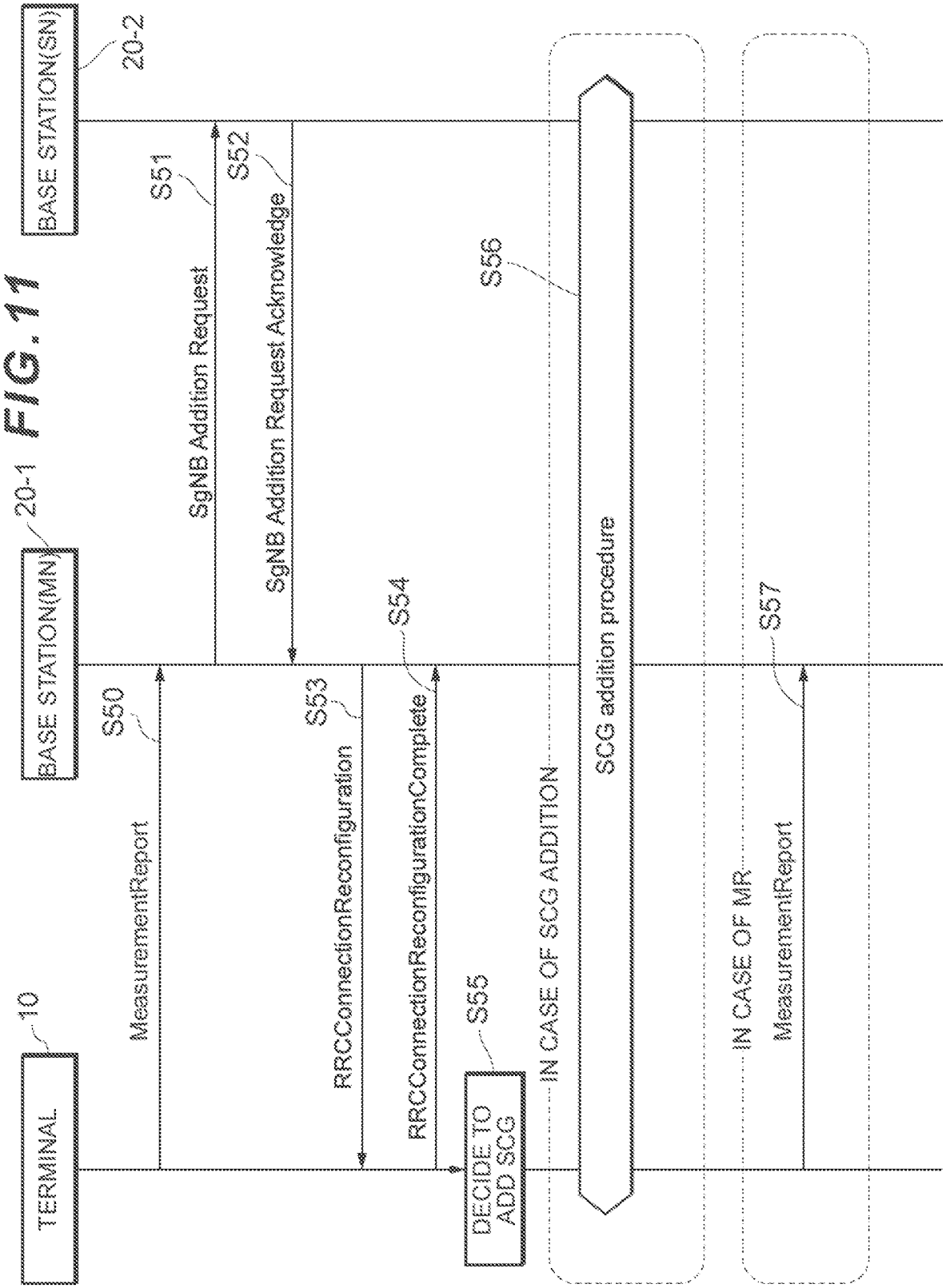
FIG. 11 is a diagram illustrating an example of a secondary cell group addition procedure according to this embodiment.

FIG. 11 is a diagram illustrating an example of the secondary cell group addition procedure according to this embodiment.

Firstly, a measurement configuration including a measurement event (Event X2 in this example) which triggers transmission of the measurement report message is set for the terminal 10. The terminal 10 evaluates the measurement event with respect to a measurement object cell corresponding to the indicated measurement event (Event X2) among neighboring cells.

In this situation, if the measurement event is fulfilled for one of the measurement object cells (Cell-X2) (that is, if the measurement result of the measurement object cell (Cell-X2) fulfills the condition for Event X2), the terminal 10 transmits a measurement report message to the base station 20-1 (S50).

The base station 20-1 which has received the measurement report message: determines that the terminal 10 has detected Cell-X2 which fulfills the condition for Event X2; and transmits a secondary gNB addition request (SgNB Addition Request) message to the base station 20-2 which provides Cell-X2 (S51). The base station 20-2 judges whether or not to add Cell-X2 on the basis of, for example, an occupied state of radio resources for Cell-X2 and transmits a secondary gNB addition request response (SgNB Addition Request Acknowledge) message indicating the judgment result to the base station 20-1 (S52).

The base station 20-1 which has received the secondary gNB addition request response from the base station 20-2 transmits an RRC message (RRC Connection Reconfiguration) that includes a measurement configuration, which includes a measurement object including information indicating the secondary cell group addition object cell (Cell-X2 in this example) and information indicating the object cells of the measurement report (Cell-Y2 and Cell-Z2 in this example), and a reporting configuration including the condition to initiate the secondary cell group addition processing (Event Y2 in this example), to the terminal 10 (S53). The terminal 10 transmits an RRC message (RRC Connection Reconfiguration Complete) to the base station 20-1 (S54).

The terminal 10 decides whether or not to initiate the secondary cell group addition processing, by measuring whether Cell-X2 fulfills Event Y2 or not on the basis of the measurement configuration included in the received RRC message (S55). If Cell-X2 fulfills Event Y2, the terminal 10 acquires synchronization with Cell-X2 and attempts to make a random access to the base station 20-2. If the random access procedure has been successfully performed with the base station 20-2, the terminal 10 performs processing with the base station 20-2 regarding the addition of the secondary cell group (S56).

Let us assume that in the processing procedure of step S55, Cell-X2 does not fulfill Event Y2, but the terminal 10 determines that Cell-Y2 fulfills Event Y2. In this case, the terminal 10 transmits a measurement report message (Measurement Report) indicating that Cell-Y2 fulfills Event Y2, to the base station 20-1 (S57). Then, the base station 20-1 may perform, for example, a processing procedure similar to the processing procedure in step S51 to step S54 between the base station 20, which provides Cell-Y2, and the terminal 10. The terminal 10 is allowed to add Cell-Y2 as the secondary cell group.

Incidentally, the above-explained processing procedures in FIG. 9 and FIG. 11 may be combined together. If the object cell of the conditional handover procedure fulfills the triggering condition for the measurement event, the terminal 10 may perform the conditional handover procedure; and if the object cell of the secondary cell group fulfills the measurement event, the terminal 10 may perform the secondary cell group addition procedure. Furthermore, the terminal 10 may perform a secondary cell group change procedure instead of the secondary cell group addition procedure.

(Specific Examples of Measurement Configuration)

Next, specific examples of the measurement configuration according to this embodiment will be explained.

Figure 12:
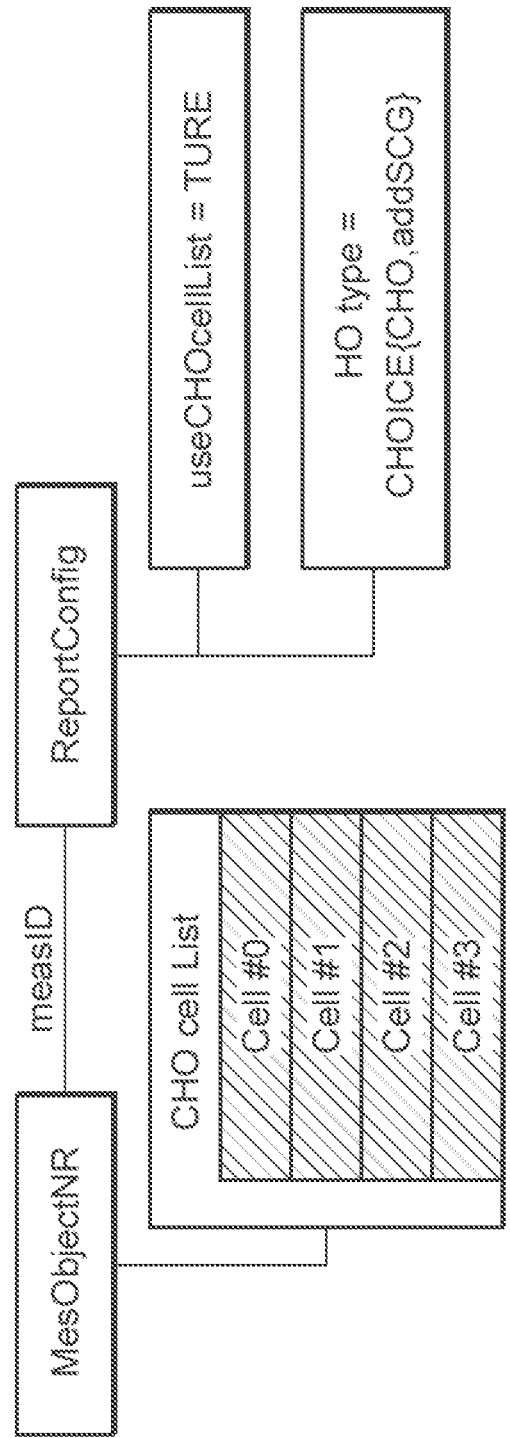
FIG. 12 is a diagram illustrating a specific example (1) of a measurement configuration.

FIG. 12 is a diagram illustrating a specific example (1) of the measurement configuration. In the measurement configuration, the measurement object is associated with the reporting configuration via the measurement identifier (measID) in the same manner as the conventional EUTRA and 5G (NR).

The measurement object includes a CHO cell list which is information indicating an object cell(s) of the conditional handover. The CHO cell list can include one or more physical cell IDs (PCI: Physical Cell Identifier) of the object cells of the conditional handover. Incidentally, The measurement object may include information indicating frequency and time resource information and subcarrier spacing information of a reference signal to be measured by the terminal 10, which is defined by the conventional specifications, and information indicating a cell(s) which is a report object(s) of the measurement report message such as the black cell list and the white cell list.

The reporting configuration includes the "measurement event" which is the conditional configuration indicating the condition to initiate the conditional handover procedure. The measurement event may be the same as the measurement event indicated in FIG. 2 or may be the measurement event (for example, Event Y1 mentioned earlier) which is associated with the condition for the terminal 10 to initiate the conditional handover procedure.

Furthermore, the reporting configuration may include a flag (useCHOcellList) indicating whether the CHO cell list is valid or invalid. Furthermore, the reporting configuration may include an "HO type" which is a flag indicating whether a cell(s) included in the CHO cell list is a conditional handover object or a secondary cell group addition object. Incidentally, if the HO type is included, the CHO cell list may be called a "Cell List" or may be called a "CHO/SCG add cell list." For example, if addSCG is set to the HO type, it means that the cell(s) included in the CHO cell list is the secondary cell group addition object cell. Incidentally, the CHO cell list regarding which the HO type is addSCG corresponds to the "information indicating the object cell of the secondary cell group." Incidentally, the cell(s) included in the CHO cell list may also mean that it is an object cell relating to a change of the secondary cell group.

If the HO type is addSCG, the reporting configuration may include the "measurement event" which is the conditional configuration indicating the condition to initiate the secondary cell group addition procedure. The measurement event may be the same as the measurement event indicated in FIG. 2 or may be the measurement event (for example, Event Y2 mentioned earlier) which is associated with the condition for the terminal 10 to initiate the secondary cell group addition processing.

Figure 13:
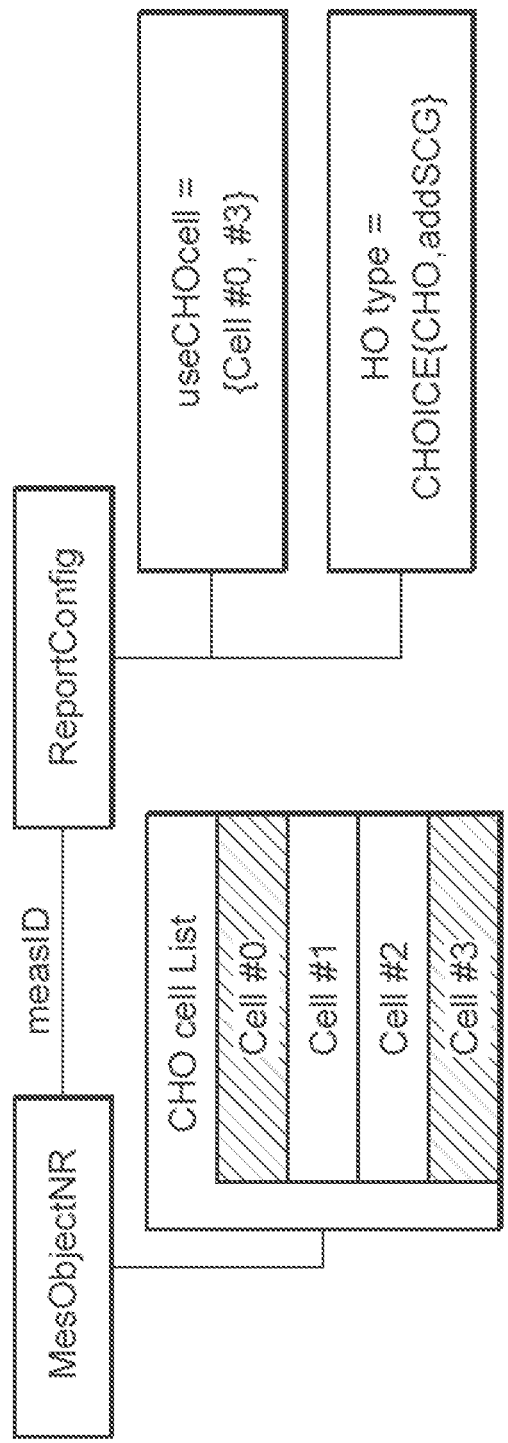
FIG. 13 is a diagram illustrating a specific example (2) of the measurement configuration.

FIG. 13 is a diagram illustrating a specific example (2) of the measurement configuration. In the specific example (2) of the measurement configuration, the reporting configuration includes a flag (useCHOcell) indicating a cell(s) in the CHO cell list regarding which a conditional handover object cell is valid. For example, if cells #0 and #3 are set to useCHOcell, it means that only the cells #0 and #3 are conditional handover object cells, among the cells #0 to #3 included in the CHO cell list. Other matters which are not referred to are the same as those of the specific example (1) of the measurement configuration.

Figure 14:
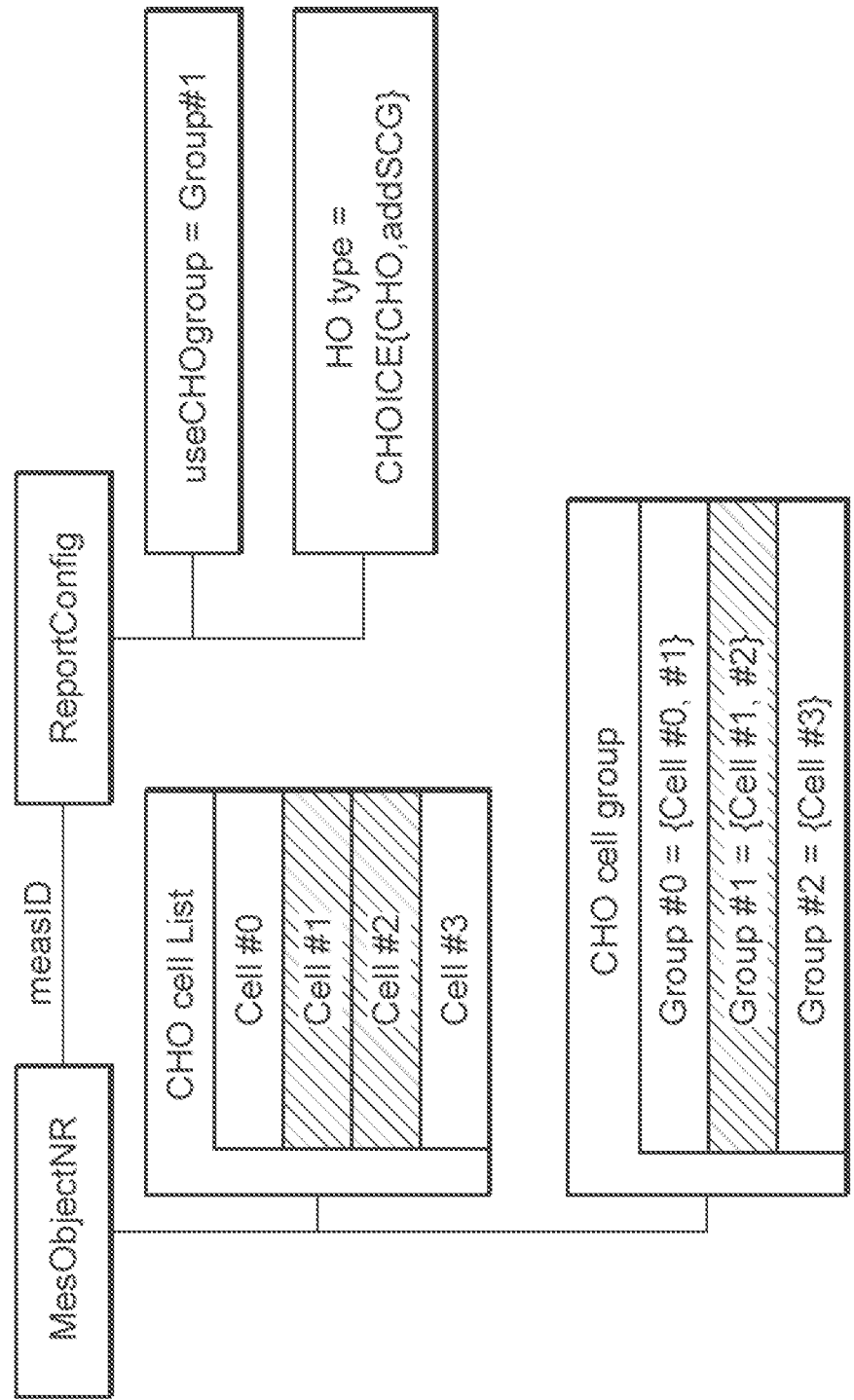
FIG. 14 is a diagram illustrating a specific example (3) of the measurement configuration.

FIG. 14 is a diagram illustrating a specific example (3) of the measurement configuration. In the specific example (3) of the measurement configuration, the measurement object(s) includes, in addition to the CHO cell list, CHO cell groups formed by dividing conditional handover object cells into groups.

Also, the reporting configuration includes information (useCHOgroup) indicating which group among the CHO cell groups is indicated as conditional handover object cells. For example, if useCHOgroup is set to Group #1, Cell #1 and Cell #2 which are included in Group #1 of the CHO cell groups are the conditional handover object cells. Other matters which are not referred to are the same as those in the specific example (1) of the measurement configuration.

Figure 15:
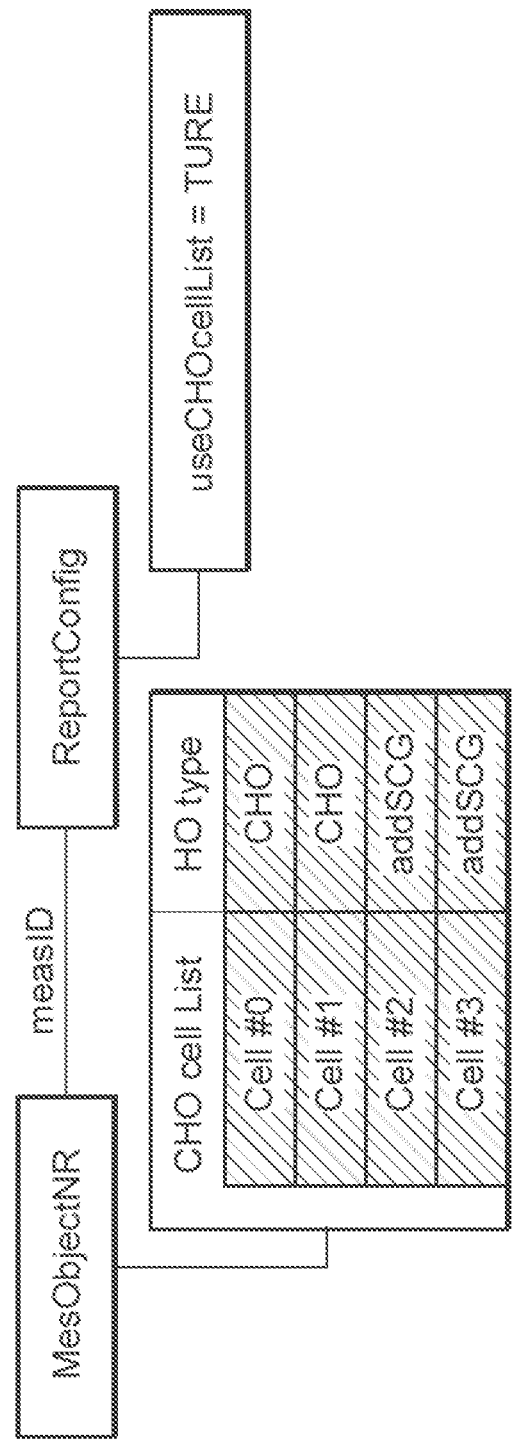
FIG. 15 is a diagram illustrating a specific example (4) of the measurement configuration.

FIG. 15 is a diagram illustrating a specific example (4) of the measurement configuration. In the specific example (4) of the measurement configuration, the HO type indicating whether the relevant cell is a conditional handover object cell or a secondary cell group addition object cell is associated with each of the cells included in the CHO cell list. In the specific example (4) of the measurement configuration, unlike the specific examples (1) to (3) of the measurement configuration, whether the relevant cell is the conditional handover object cell or the secondary cell group addition object cell can be set for each cell. Other matters which are not referred to are the same as those in the specific example (1) of the measurement configuration.

Figure 16:
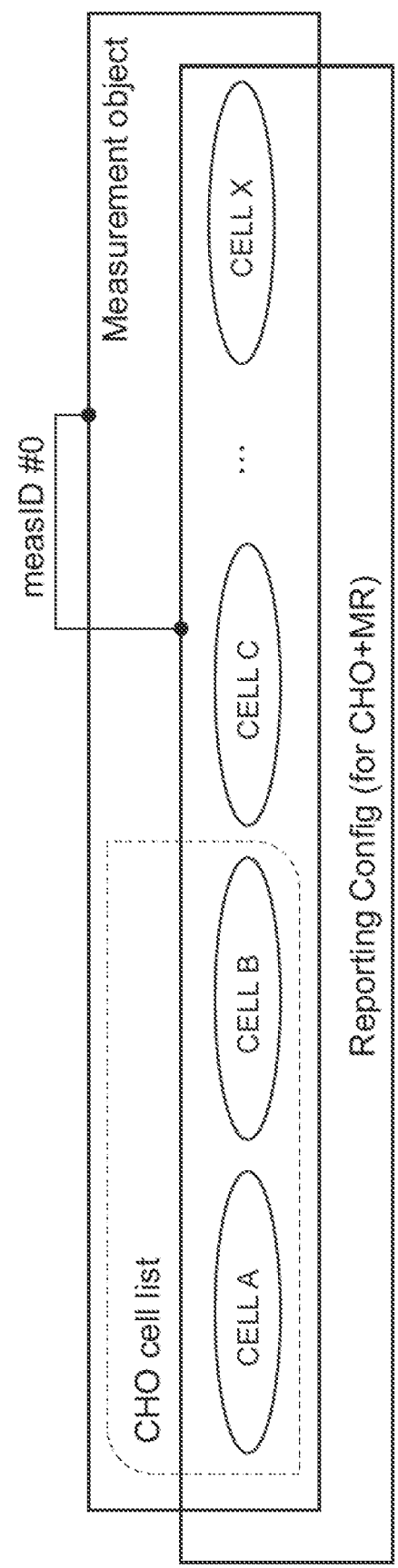
FIG. 16 is a diagram illustrating an example (1) of a method for designating a measurement object cell based on the measurement configuration.

FIG. 16 is a diagram illustrating an example (1) of a method for designating a measurement object cell(s) based on the measurement configuration. In the example in FIG. 16, cell A to cell X are considered as measurement object cells on the basis of one measurement object and one reporting configuration; and, furthermore, cell A and cell B among the measurement object cells are indicated as conditional handover object cells. Furthermore, the reporting configuration includes a measurement event corresponding to the conditional handover procedure and/or a measurement event corresponding to the measurement report. Furthermore, the measurement object and the reporting configuration are associated with each other via the same measurement identifier (measID #0). Cell A to cell X may be cells which can be measured as neighboring cells among cells with the frequency indicated by the measurement object, or may be cells indicated in the white cell list included in the measurement object. Furthermore, if the measurement object includes the black cell list, cell A to cell X may be cells obtained by excluding cells indicated in the black cell list.

Figure 17:
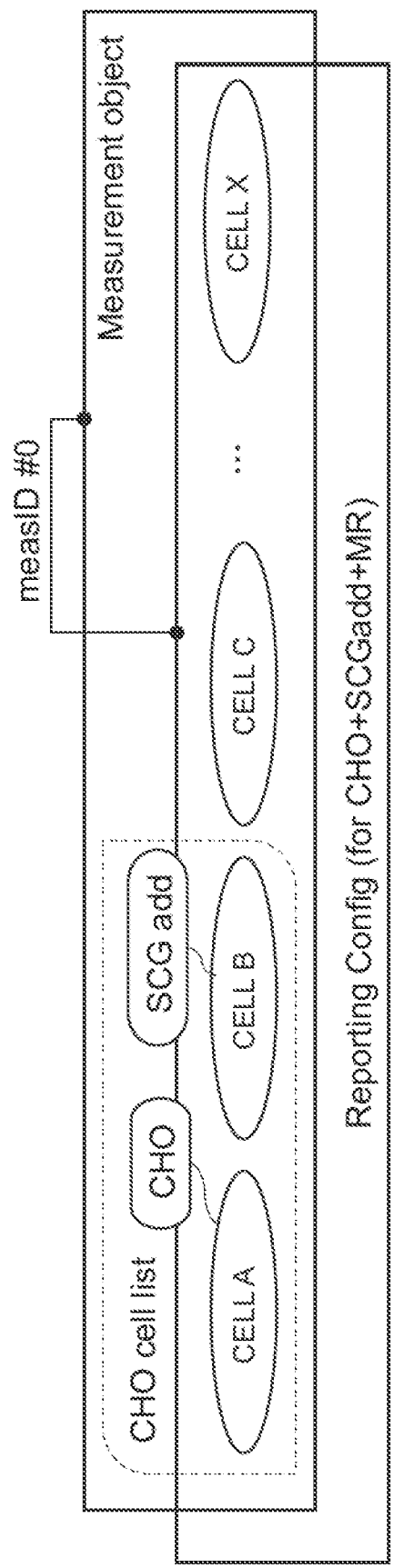
FIG. 17 is a diagram illustrating an example (2) of the method for designating the measurement object cell based on the measurement configuration.

FIG. 17 is a diagram illustrating an example (2) of a method for designating a measurement object cell(s) based on the measurement configuration. In the example in FIG. 17, cell A to cell X are considered as measurement object cells on the basis of one measurement object and one reporting configuration; and, furthermore, among the measurement object cells, cell A is indicated as a conditional handover object cell and cell B is indicated as a secondary cell group addition object cell. The judging method performed by the terminal 10 to consider cell A to cell X as the measurement object cells may be the same as that of the example in FIG. 16. Furthermore, the reporting configuration includes at least one of a measurement event corresponding to the conditional handover procedure, a measurement event corresponding to the secondary cell group addition, and a measurement event corresponding to the measurement report. Furthermore, the measurement object and the reporting configuration are associated with each other via the same measurement identifier (measID #0).

The above-explained configuration examples of the measurement configuration are just examples and this embodiment is not limited to these examples. For example, the indication of the secondary cell group addition object cell may be defined by using a separate list from the CHO cell list. For example, an SCG addition cell list may be defined by the measurement object. Furthermore, the SCG addition cell list may be defined by an IE (Information Element)

which is different from the measurement object. For example, the SCG addition cell list may be defined in IE (CellGroupConfig) which sets a master cell group and a secondary cell group.

(Processing Procedure of Terminal)

Figure 18:
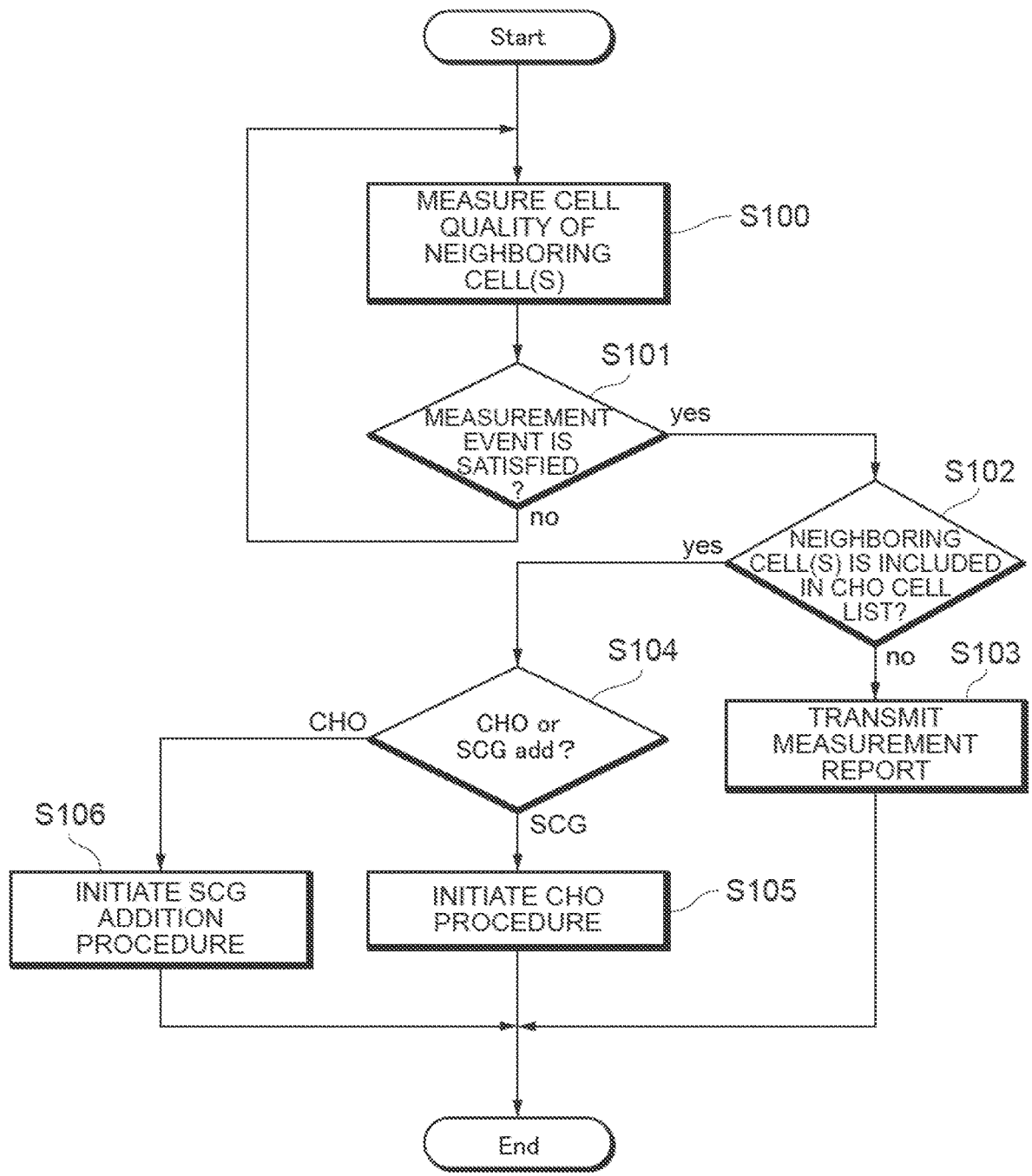
FIG. 18 is a flowchart illustrating an example of a processing procedure performed by the terminal.

FIG. 18 is a flowchart illustrating an example of a processing procedure performed by the terminal 10. The terminal 10 for which the measurement configuration is configured decides a measurement object cell on the basis of a measurement object and a reporting configuration, and measures the cell quality of a neighboring cell considered as the measurement object cell (S100). Next, the terminal 10 judges whether or not the measured cell quality fulfills the measurement event (the aforementioned Event A3 or Event Y1, Event Y2, etc.) corresponding to the conditional handover procedure or the secondary cell group addition processing, which is included in the reporting configuration (S101). If the measured cell quality does not fulfill the above-described measurement event, the processing returns to the processing procedure in step S100; and if the measured cell quality fulfills the above-described measurement event, the processing proceeds to step S102. Next, the terminal 10 judges whether a physical cell ID of the cell which fulfills the measurement event is included in the CHO cell list or not (S102). If the physical cell ID of the cell is not included in the CHO cell list, the processing proceeds to step S103; and if the physical cell ID of the cell is included in the CHO cell list, the processing proceeds to step S104.

The terminal 10 transmits a measurement report message including the measured cell quality of the neighboring cell (which is also called a "concerned cell") to the base station 20 (S103).

If the HO type is indicated, the terminal 10 checks if the HO type is CHO or SCG add (S104). If the HO type is CHO, the processing proceeds to step S105; and if the HO type is SCG add, the processing proceeds to step S106. Alternatively, the terminal 10 may check whether the HO type is CHO or SCG add, according to the measurement event (Event Y1, Event Y2). In this case, information indicating which measurement event corresponds to CHO or SCG add may be included in the measurement configuration or may be defined statically by the standard specifications.

The terminal 10 initiates the conditional handover procedure with respect to the neighboring cell (S105). The terminal 10 initiates the secondary cell group addition procedure with respect to the neighboring cell (S106).

In the processing procedure explained above, if the measurement event regarding the secondary cell group addition processing is not included in the reporting configuration, the procedure of step S104 and step S106 does not exist.

(Processing Procedure of Base Station)

Figure 19:
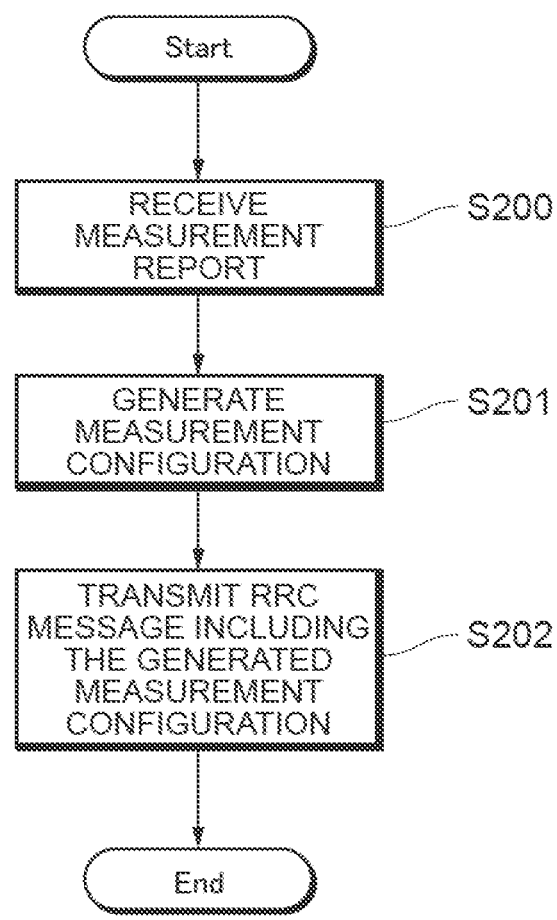
FIG. 19 is a flowchart illustrating an example of a processing procedure performed by the base station.

FIG. 19 is a flowchart illustrating an example of a processing procedure performed by the base station 20. The base station 20 receives a measurement report message indicating the reception quality of a cell from the terminal 10 (S200). Then, the base station 20 generates an RRC message including the measurement configuration explained with reference to, for example, FIG. 12 to FIG. 15 (S201). Next, the base station 20 transmits the generated RRC message to the terminal 10 (S202).

<Examples of Changes to Specifications>

FIG. 20 is a diagram illustrating an example of a change to the standard specifications (3GPP TS38.331) according to this embodiment. The example in FIG. 20 is an example of a change to the standard specifications corresponding to the processing procedure other than step S104 and step S106 in FIG. 18.

FIG. 21 is a diagram illustrating an example of a change to the standard specifications (3GPP TS38.331) according to this embodiment. The example in FIG. 21 is an example of a change to the standard specifications corresponding to the processing procedure in FIG. 18.

Conclusion

According to the above-explained embodiment, if the measurement object fulfills the measurement event indicated by the measurement report, it is possible to flexibly perform the conditional handover procedure, the secondary cell group addition procedure, and the transmission of the measurement report message. Consequently, it becomes possible to provide a flexible mobility procedure.

Furthermore, according to this embodiment, if the object cell of the conditional handover procedure does not fulfill the measurement event to initiate the conditional handover procedure and if another cell fulfills the measurement event, the terminal 10 is allowed to transmit a measurement report message, including the measured cell quality of that other cell, to the base station 20. Consequently, the base station 20 is allowed to indicate to the terminal 10 to perform the conditional handover to the other cell and it becomes possible to provide more flexible mobility control.

Furthermore, according to this embodiment, if it is more preferable that the measured cell could be added as the secondary cell group rather than performing the handover, it is made possible to indicate to the terminal 10 to add the secondary cell group. Consequently, it becomes possible to provide more flexible mobility control and enhance a communication speed between the terminal 10 and the base station 20.

Supplementary Note of Embodiment

The above-explained embodiment is designed to make it easy to understand the present invention, but is not intended to interpret the present invention in a limited manner. The flowcharts, sequences, the respective elements included in the embodiment and their arrangement, materials, conditions, shapes, sizes, and so on which have been explained in the embodiment are not limited to those illustrated as examples, but can be changed as appropriate. Furthermore, it is possible to partially replace or combine configurations indicated in different embodiments.

The terminal 10 and/or the base station 20 may include hardware such as integrated circuits of a DSP (Digital Signal Processor), an ASIC (Application Specific Integrated Circuit), a PLD (Programmable Logic Device), an FPGA (Field Programmable Gate Array), and an SoC (System-on-a-chip). A part or whole of each functional block may be implemented by the above-mentioned hardware. Furthermore, the processor 11 may be at least one of the above-mentioned hardware.

The sequential order of the sequences and the flowcharts which are explained in the embodiment may be switched so long as no processing contradiction occurs.

REFERENCE SIGNS LIST 1 radio communication system
10 terminal
11 processor
12 memory
13 communication apparatus
14 storage apparatus 14 communication apparatus
15 input device
16 output device
17 antenna
20 base station
20-1 base station
20-2 base station
40 core network apparatus
100 transmission unit
101 reception unit
102 measurement unit
103 control unit
200 transmission unit
201 reception unit
202 control unit
203 generation unit

The invention claimed is:

1. A terminal comprising:
a reception unit that receives, from a base station, information indicating an object cell on which given processing is to be performed, and a conditional configuration indicating a condition to initiate the given processing;
a measurement unit that measures a cell; and
a control unit that initiates the given processing corresponding to the conditional configuration when the measured cell is included in the object cell and a measurement result of the measured cell fulfills the condition to initiate the given processing,
wherein the given processing includes at least initiating a secondary cell group cell change procedure;
wherein the information indicating the object cell includes information indicating an object cell to be changed with respect to a secondary cell group;
wherein the conditional configuration includes a condition to initiate the secondary cell group cell change procedure; and
wherein when the measured cell is included in the object cell to be changed with respect to the secondary cell group and the measurement result of the measured cell fulfills the conditional configuration indicating the condition to initiate the secondary cell group cell change procedure, the control unit initiates processing for changing the measured cell in the secondary cell group.

2. The terminal according to claim 1,
wherein the given processing includes at least initiating a conditional handover procedure and initiating a measurement report procedure;
wherein the information indicating the object cell includes information indicating an object cell regarding which conditional handover is to be performed, and information indicating an object cell regarding which a measurement report is to be performed; and
wherein the conditional configuration includes a condition to initiate the conditional handover procedure.

3. A terminal comprising:
a reception unit that receives, from a base station, information indicating an object cell on which given processing is to be performed, and a conditional configuration indicating a condition to initiate the given processing;
a measurement unit that measures a cell; and
a control unit that initiates the given processing corresponding to the conditional configuration when the measured cell is included in the object cell and a measurement result of the measured cell fulfills the condition to initiate the given processing,
wherein the given processing includes at least initiating a secondary cell group addition procedure;
wherein the information indicating the object cell includes information indicating an object cell to be added to a secondary cell group:
wherein the conditional configuration includes a condition to initiate the secondary cell group addition procedure; and
wherein when the measured cell is included in the object cell to be added to the secondary cell group and the measurement result of the measured cell fulfills the conditional configuration indicating the condition to initiate the secondary cell group addition procedure, the control unit initiates processing for adding the measured cell in the secondary cell group.

4. The terminal according to claim 3,
wherein the given processing includes at least initiating a conditional handover procedure and initiating a measurement report procedure;
wherein the information indicating the object cell includes information indicating an object cell regarding which conditional handover is to be performed, and information indicating an object cell regarding which a measurement report is to be performed; and
wherein the conditional configuration includes a condition to initiate the conditional handover procedure.

5. A radio communication method performed by a terminal, comprising the steps of:
receiving, from a base station, information indicating an object cell on which given processing is to be performed, and a conditional configuration indicating a condition to initiate the given processing;
measuring a cell; and
initiating the given processing corresponding to the conditional configuration when the measured cell is included in the object cell and a measurement result of the measured cell fulfills the condition to initiate the given processing,
wherein the given processing includes at least initiating a secondary cell group cell change procedure;
wherein the information indicating the object cell includes information indicating an object cell to be changed with respect to a secondary cell group;
wherein the conditional configuration includes a condition to initiate the secondary cell group cell change procedure; and
wherein when the measured cell is included in the object cell to be changed with respect to the secondary cell group and the measurement result of the measured cell fulfills the conditional configuration indicating the condition to initiate the secondary cell group cell change procedure, the step of initiating the given processing initiates processing for changing the measured cell in the secondary cell group.

6. The radio communication method according to claim 5,
wherein the given processing includes at least initiating a conditional handover procedure and initiating a measurement report procedure;
wherein the information indicating the object cell includes information indicating an object cell regarding which conditional handover is to be performed, and information indicating an object cell regarding which a measurement report is to be performed; and
wherein the conditional configuration includes a condition to initiate the conditional handover procedure.

7. A radio communication method performed by a terminal, comprising the steps of:

receiving, from a base station, information indicating an object cell on which given processing is to be performed, and a conditional configuration indicating a condition to initiate the given processing;

measuring a cell; and initiating the given processing corresponding to the conditional configuration when the measured cell is included in the object cell and a measurement result of the measured cell fulfills the condition to initiate the given processing, wherein the given processing includes at least initiating a secondary cell group addition procedure;

wherein the information indicating the object cell includes information indicating an object cell to be added to a secondary cell group;

wherein the conditional configuration includes a condition to initiate the secondary cell group addition procedure; and wherein when the measured cell is included in the object cell to be added to the secondary cell group and the measurement result of the measured cell fulfills the conditional configuration indicating the condition to initiate the secondary cell group addition procedure, the step of initiating the given processing initiates processing for adding the measured cell in the secondary cell group.

8. The radio communication method according to claim 7, wherein the given processing includes at least initiating a conditional handover procedure and initiating a measurement report procedure;

wherein the information indicating the object cell includes information indicating an object cell regarding which conditional handover is to be performed, and information indicating an object cell regarding which a measurement report is to be performed; and wherein the conditional configuration includes a condition to initiate the conditional handover procedure.

* * * * *